(12) United States Patent
Tajiri

(10) Patent No.: US 8,860,826 B2
(45) Date of Patent: Oct. 14, 2014

(54) IMAGE PICKUP APPARATUS THAT ACQUIRES A PLURALITY OF VIEWPOINT IMAGES

(75) Inventor: Shinichiro Tajiri, Tokyo (JP)

(73) Assignee: Sony Corporation, Tokyo (JP)

( * ) Notice: Subject to any disclaimer, the term of this patent is extended or adjusted under 35 U.S.C. 154(b) by 698 days.

(21) Appl. No.: 13/047,398

(22) Filed: Mar. 14, 2011

(65) Prior Publication Data

US 2011/0221925 A1    Sep. 15, 2011

(30) Foreign Application Priority Data

Mar. 15, 2010 (JP) ................ P2010-058304

(51) Int. Cl.
*H04N 5/228* (2006.01)
*G03B 35/04* (2006.01)
*G03B 9/08* (2006.01)
*H04N 5/235* (2006.01)

(52) U.S. Cl.
CPC . *G03B 35/04* (2013.01); *G03B 9/08* (2013.01)
USPC .............. 348/208.5; 348/222.1; 348/367; 396/457

(58) Field of Classification Search
USPC ............ 348/208.5, 208.6, 208.7, 222.1, 367, 348/E05.04
See application file for complete search history.

(56) References Cited

U.S. PATENT DOCUMENTS

| 6,542,194 | B1 * | 4/2003 | Juen ............................. 348/367 |
| 7,907,206 | B2 * | 3/2011 | Toyoda ......................... 348/367 |
| 7,911,502 | B2 * | 3/2011 | Suzuki ........................ 348/222.1 |
| 8,553,116 | B2 * | 10/2013 | Tsubono ....................... 348/296 |
| 2001/0017649 | A1 * | 8/2001 | Yaron ............................. 348/45 |
| 2011/0115882 | A1 * | 5/2011 | Shahinian et al. .............. 348/45 |
| 2012/0038749 | A1 * | 2/2012 | Yen ................................. 348/49 |

FOREIGN PATENT DOCUMENTS

| JP | 09-505906 | 6/1997 |
| JP | 2002-034056 | 1/2002 |

* cited by examiner

*Primary Examiner* — Hung Lam
(74) *Attorney, Agent, or Firm* — K&L Gates LLP

(57) ABSTRACT

An image capturing apparatus includes an image sensor configured to operate in a line-sequential manner and a shutter device operatively coupled to the image sensor. The shutter device includes regions configured to switch between substantially open states and substantially closed states such that after a first exposure for a first frame is finished, a second exposure for a second frame is started.

20 Claims, 20 Drawing Sheets

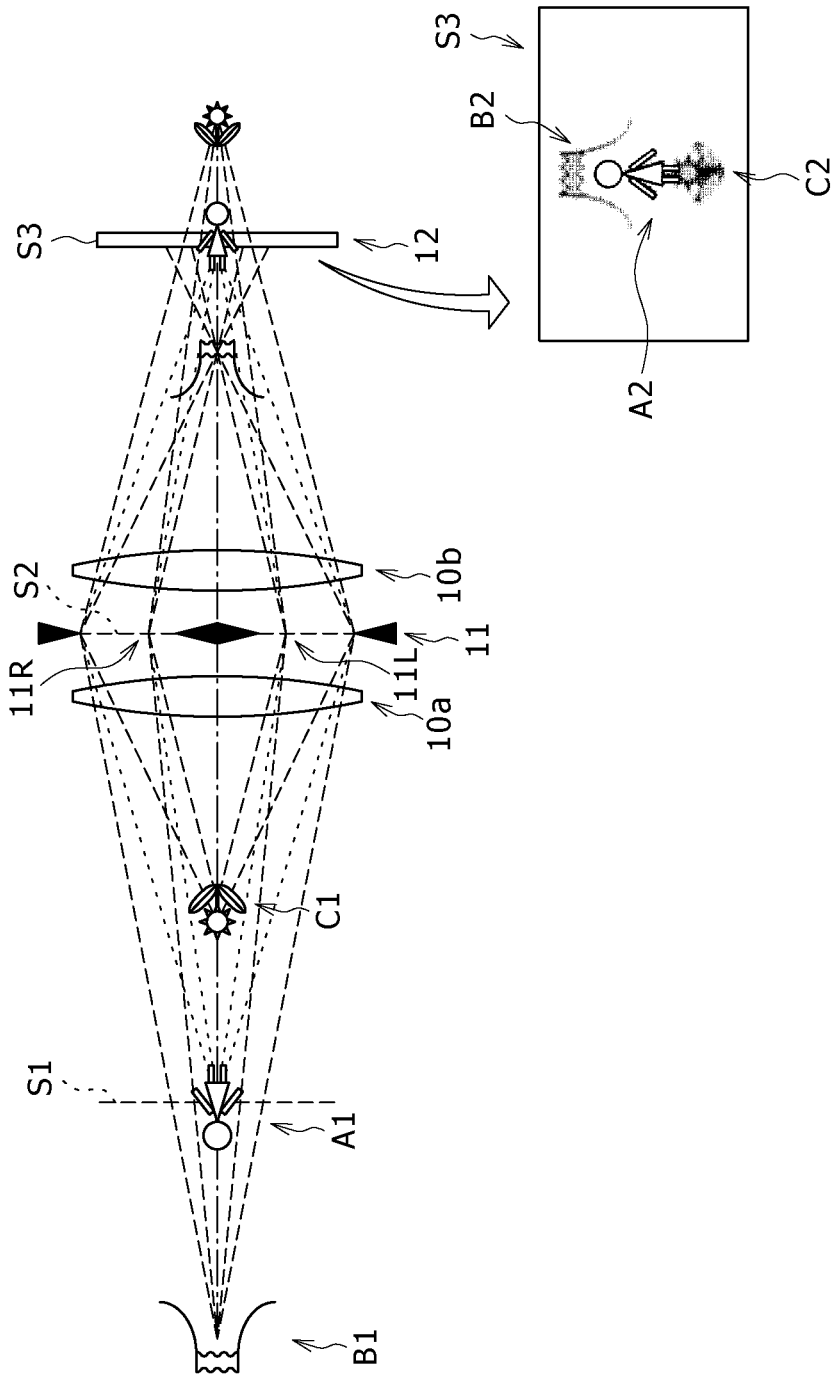

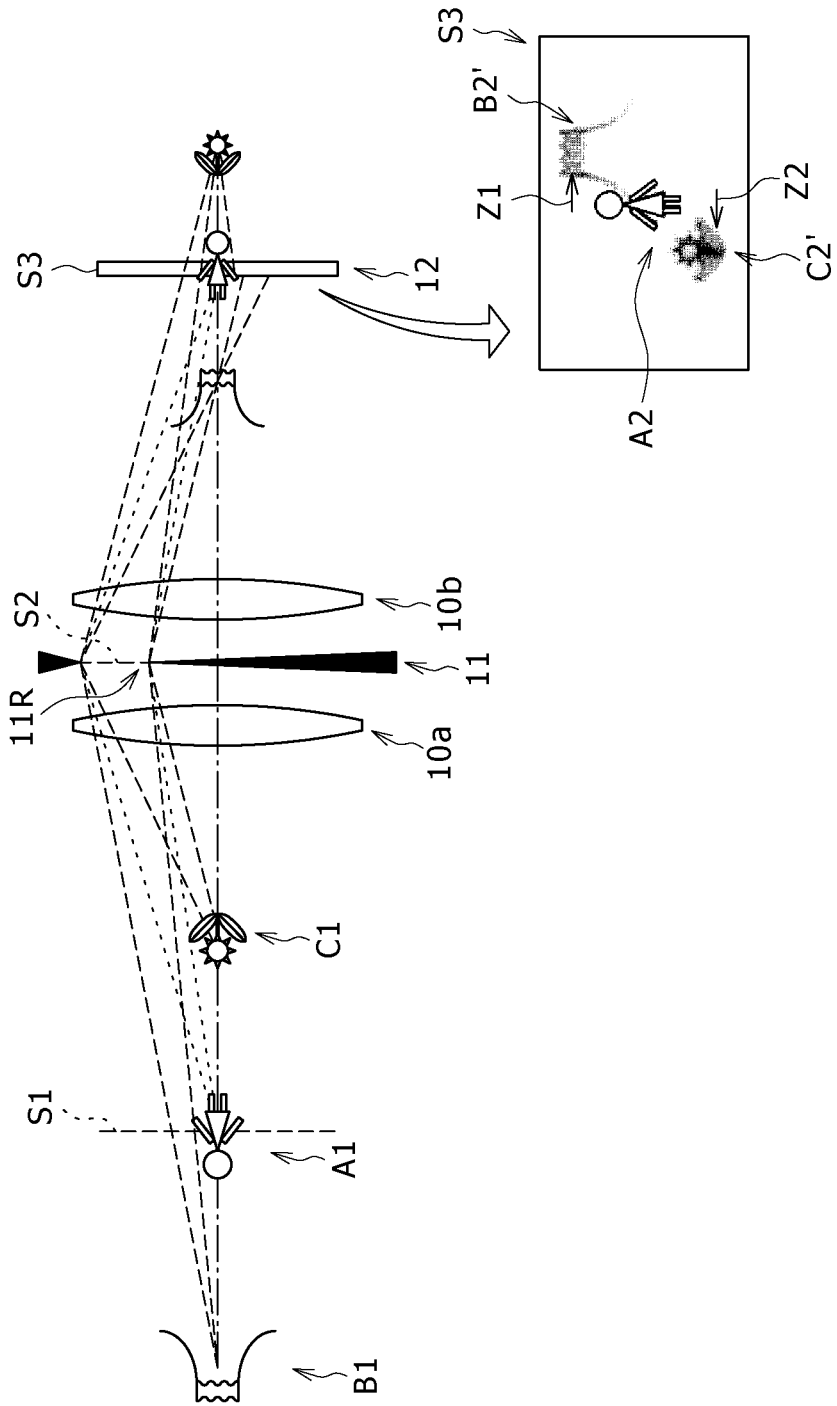

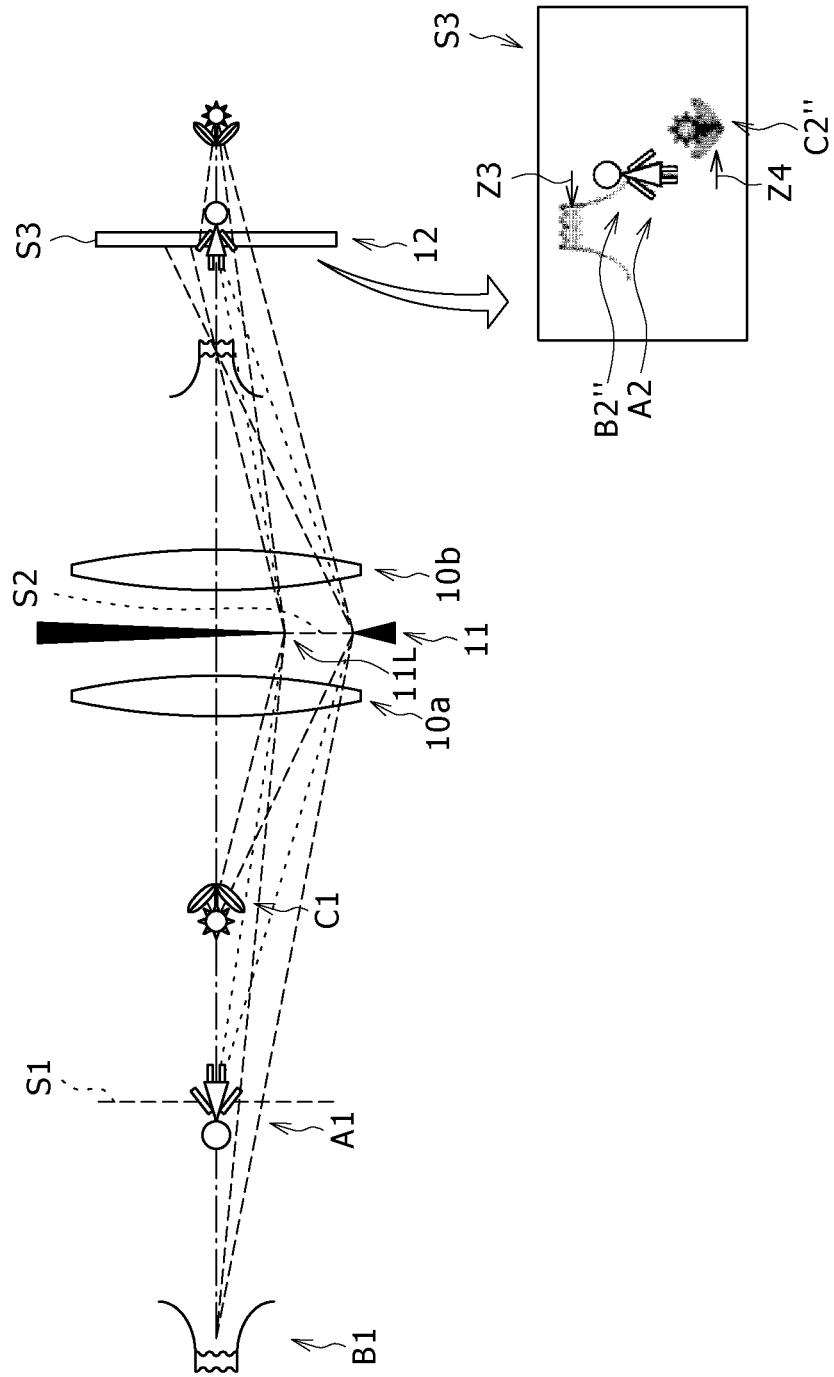

IMAGE PICKUP APPARATUS THAT ACQUIRES A PLURALITY OF VIEWPOINT IMAGES

CROSS REFERENCES TO RELATED APPLICATIONS

The present application claims priority to Japanese Patent Application No. JP 2010-058304, filed in the Japanese Patent Office on Mar. 15, 2010 the entire contents of which is being incorporated herein by reference.

BACKGROUND

Various kinds of image pickup apparatuses have been proposed and developed. For example, an image pickup apparatus including an image capturing lens, and a shutter which is divided into a right-hand side region and a left-hand side region, and open and close of which are selectively switchable every division region has been proposed. This image pickup apparatus, for example, is described in Japanese Patent No. 1,060,618 ("Patent Document 1"), Japanese Patent Laid-Open No. 2002-34056 ("Patent Document 2"), and JP-A-H09-505906. According to this image pickup apparatus, the open and close for the right-hand and left-hand side regions of the shutter are alternately switched over to each other in a time division manner, thereby switching a transmission optical path. As a result, two kinds of images (a left-hand side viewpoint image and a right-hand side viewpoint image) which are apparently obtained through the photographing from right-hand and left-hand side viewpoints by using one image pickup optical system can be acquired in the time division manner. The left-hand side viewpoint image and the right-hand side viewpoint image are offered to the eyes of the human being by using some sort of means, whereby the human being can feel a stereoscopic effect in the image.

Many image pickup apparatuses each of which can acquire the right-hand and left-hand side viewpoint images in the manner as described above by itself are aimed at a still image. In addition, the image pickup apparatus which photographs a moving image is also proposed. This, for example, is described in Patent Documents 1 and 2. Any of these image pickup apparatuses uses a so-called global shutter type Charge Coupled Device (CCD), as an image sensor, in which exposure and signal reading are carried out in a frame-sequential manner.

However, in recent years, a Complementary Metal Oxide semiconductor (CMOS) sensor which can realize a low cost, low power consumption and high-speed processing as compared with the case of the CCD has become a mainstream. Unlike the CCD as described above, the CMOS sensor is a so-called rolling shutter type image sensor in which the exposure and the signal reading are carried out in a line-sequential manner. With the CCD described above, the entire picture is collectively photographed at the same time in each of frames. On the other hand, with the CMOS sensor, because the driving, for example, is carried out from an upper portion to a lower portion of the screen in the line-sequential manner, a time lag is generated in an exposure period of time or at a reading timing every line in each of the frames.

For this reason, when the CMOS sensor is used in the image pickup apparatus which carries out the photographing while the optical path is switched by the shutter as described above, a time lag is generated between an open period of time for each of the regions in the shutter, and an exposure period of time for the corresponding frame. As a result, there is encountered a problem such that in each of the frames, a transmitted light in the right-hand side region of the shutter, and a transmitted light in the left-hand side region of the shutter are mixedly received (crosstalk is generated between right-hand and left-hand side viewpoint images), and thus images of multiple viewpoints (the right-hand and left-hand side viewpoint images in this case) cannot be precisely acquired. Because amounts of right-hand and left-hand side parallaxes are reduced when the crosstalk is generated between the viewpoint images in such a manner, a desired stereoscopic effect is hardly obtained (easily recognized as a planar image).

SUMMARY

The present disclosure has been made in order to solve the problems described above, and it is therefore desirable to provide an image pickup apparatus which is capable of precisely acquiring a plurality of viewpoint images by using a line-sequential drive type image pickup element.

The present disclosure relates to an image pickup apparatus which, for example, is suitable for acquiring a parallax image utilized in three-dimensional display.

In one example embodiment, an image capturing apparatus includes an image sensor configured to operate in a line-sequential manner. In one example embodiment, a shutter device is operatively coupled to the image sensor. In one example embodiment, the shutter device includes regions configured to switch between substantially open states and substantially closed states such that after a first exposure for a first frame is finished, a second exposure for a second frame is started.

In one example embodiment, the image sensor is the only image sensor included in the image capturing apparatus.

In one example embodiment, the shutter device is the only shutter device included in the image capturing apparatus.

In one example embodiment, the image sensor is configured to output a received light signal based on a light transmitted through the shutter device.

In one example embodiment, the regions include (a) a first region configured to switch between a first substantially open state and a first substantially closed state; and (b) a second region configured to switch between a second substantially open state and a second substantially closed state.

In one example embodiment, when (or in response to) the second exposure is started: (a) the first region switches from the first substantially open state to the first substantially closed state; and (b) the second region switches from the second substantially closed state to the second substantially open state.

In one example embodiment, the image sensor shutter includes a global reset function wherein accumulated electric charges are reset at a predetermined time.

In one example embodiment, the regions are configured to start switching from the substantially closed states to the substantially open states before an occurrence of a frame start time corresponding to a start of the first exposure.

In one example embodiment, the regions are configured to switch from the substantially open states to the substantially closed states before an occurrence of a frame start time corresponding to a start of the second exposure.

In one example embodiment, a first start of the first exposure begins after a second start of the first frame.

In one example embodiment, the image capturing apparatus includes a controller storing drive sequences for the shutter device. In one example embodiment, the controller is configured to perform switching for the drive sequences based on response characteristics of the shutter device.

In one example embodiment, the shutter device includes a liquid crystal shutter which includes the regions.

In one example embodiment, a first response from a first open state to a first closed state is delayed for a first amount of time. In one example embodiment, a second response from the first closed state to the first open state is delayed for a second amount of time. In one example embodiment, the second amount of time is greater than the first amount of time. In another example embodiment, the second amount of time is less than the first amount of time.

In one example embodiment, the regions are configured to switch between the substantially open states and substantially closed states based on a material of the shutter device.

In one example embodiment, the image capturing apparatus includes a controller configured to: (a) acquire a first image based on the first exposure; (b) acquire a second image based on the second exposure; (c) acquire a third image based on a third exposure; and (d) using the first, second and third images, reduce an influence of jerkiness by performing motion blurring processing.

In one example embodiment, the image capturing apparatus includes a controller configured to: (a) acquire a first image based on the first exposure; (b) acquire a second image based on the second exposure; (c) acquire a third image based on a third exposure; (d) acquire a fourth image based on a fourth exposure; (e) generate a first interpolated image between the acquired first image and the acquired third image; and (f) generate a second interpolated image between the acquired second image and the acquired fourth image.

In one example embodiment, the regions are configured to switch between completely open states and completely closed states such that after a first exposure for a first frame is finished, a second exposure for a second frame is started.

In one example embodiment, the image capturing apparatus includes a first lens and a second lens. In one example embodiment, the shutter device is disposed between the first lens and the second lens.

In one example embodiment, the image sensor includes a complementary metal oxide semiconductor sensor.

According to the image pickup apparatus of the present embodiment, the control portion acquires at least the first frame and the second frame for which the exposure starts in and after of the exposure for the first frame in the image pickup element. As a result, it is possible to suppress the generation of the phenomenon that the transmitted lights through the regions of the shutter are mixedly received, i.e., the so-called crosstalk in each of the frames. Accordingly, it is possible to precisely acquire a plurality of viewpoint images by using the line-sequential drive type image pickup element.

Additional features and advantages are described herein, and will be apparent from the following Detailed Description and the figures.

BRIEF DESCRIPTION OF THE FIGURES

FIG. 2 is a schematic view explaining the principles (no optical path division) of acquiring viewpoint images in the example image pickup apparatus shown in FIG. 1.

FIG. 3 is a schematic view explaining the principles (right-hand side optical path) of acquiring viewpoint images in the example image pickup apparatus shown in FIG. 1.

FIG. 4 is a schematic view explaining the principles (left-hand side optical path) of acquiring viewpoint images in the example image pickup apparatus shown in FIG. 1.

DETAILED DESCRIPTION

Embodiments will be described in detail hereinafter with reference to the accompanying drawings. It is noted that the description will be given below in accordance with the following order:

1. First Example Embodiment (the case where exposure start and exposure end are carried out in a line-sequential manner).

2. Change 1 (the case where a liquid crystal shutter having characteristics in which a response speed becomes slower in a phase of transition from a light blocking state to a transmission state is used).

3. Change 2 (the case where a timing for switching from a close state to an open state is hastened).

4. Change 3 (the case where switching from the close state to the open state of the shutter, switching from the open state to the close state of the shutter, and a timing for exposure end are hastened)

5. Change 4 (the case where a timing for exposure start is slowed).

6. Change 5 (the case where a liquid crystal shutter having characteristics in which a response speed becomes slower in a phase of transition from a transmission state to a light blocking state is used).

7. Second Example Embodiment (the case where exposure start is collectively carried out by using a global reset function).

8. Change 1 (the case where a liquid crystal shutter having characteristics in which a response speed becomes slower in a phase of transition from a light blocking state to a transmission state is used).

9. Change 2 (the case where a timing for switching from a close state to an open state is hastened).

10. Change 3 (the case where a liquid crystal shutter having characteristics in which a response speed becomes slower in a phase of transition from a transmission state to a light blocking state is used).

11. Change 4 (the case where shutter control is carried out by switching of a drive sequence).

12. Example 1 of Image Processing (an example of motion blur processing).

13. Example 2 of Image Processing (an example of image interpolation processing).

First Example Embodiment

Entire Construction and Configuration of Image Pickup Apparatus 1

Figure 1:
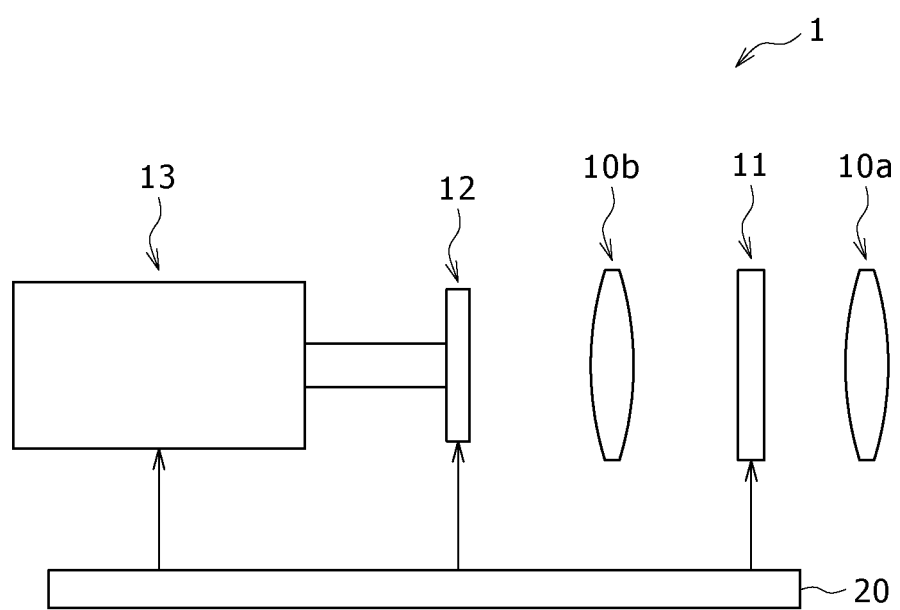
FIG. 1 is a block diagram showing an entire construction and configuration of an example image pickup apparatus according to a first embodiment.

FIG. 1 shows an entire construction and configuration of an image pickup apparatus according to a first embodiment. The image pickup apparatus 1 acquires a plurality of viewpoint images (right-hand and left-hand side viewpoint images) as a captured image (either a still image or a moving image) of a subject. The image pickup apparatus 1 includes image capturing lenses 10*a* and 10*b*, a shutter 11, an image sensor 12, a signal processing/storing portion 13, and a control portion 20.

Each of the image capturing lenses 10*a* and 10*b* is a main lens for capturing an image of the subject. For example, a general image capturing lens used in a video camera, a still camera or the like is used as each of the image capturing lenses 10*a* and 10*b*. In this case, although the image capturing lens 10*a* and the image capturing lens 10*b* are disposed on a light incidence side and a light emission side of the shutter 11, respectively, the image capturing lens 10*a* and the image capturing lens 10*b* are not limited in sheets of lenses and positions of the lenses thereto. However, preferably, the shutter 11 is ideally disposed in a position of either a pupil surface or a stop of each of the image capturing lenses 10a and 10b.

The shutter 11 is provided in order to switch an optical path of a light beam traveling toward the image sensor 12. Thus, the shutter 11 is divided into a plurality of regions, and switching of an open state (translucency state) and a close state (light blocking state) is controlled every division region. In this case, the shutter 11 has a right-hand side region 11R and a left-hand side region 11L. Thus, transmittance control for the light beam (specifically, the switching of the transmission state (open state) and the light blocking state (close state)) can be carried out every region 11R, 11L. In the regions 11R and 11L, the open state and the close state are controlled so as to be alternately switched over to each other in a time division manner. The shutter 11 is not especially limited as long as it can carry out the optical path division (optical path switching) as described above. Thus, the shutter 11 may be either a mechanical shutter or an electrical shutter such as a liquid crystal shutter.

The image sensor 12 is a photoelectric conversion element for outputting a received light signal based on a light transmitted through the image capturing lenses 10a and 10b, and the shutter 11. The image sensor 12, for example, has a plurality of photodiodes (light receiving pixels) disposed in a matrix, and thus is a rolling shutter type image pickup element (such as a CMOS sensor) for reading out signals from these photodiodes in a line-sequential manner. In the first embodiment, although the details will be described later, the exposure start and the exposure end are carried out in the image sensor 12 in the line-sequential manner. It is noted that in this specification, the exposure start and the exposure end mean storage (electric charge accumulation) start, and storage end, respectively, and a period of time from the exposure start to the exposure end (exposure period of time) corresponds to a period of time for the electric charge accumulation. In addition, for example, color filters (not shown) of R, G and B having a predetermined color disposition may be disposed on a light receiving surface side of the image sensor 12.

The signal processing/storing portion 13 subjects the captured image data output from the image sensor 12 to various kinds of processing (containing image processing), and includes suitable one, of various kinds of memories, for storing therein the captured image data.

The control portion 20, for example, is a microcomputer or the like, and controls the shutter 11, the image sensor 12 and the signal processing/storing portion 13. Specifically, the control portion 20 carries out the control in such a way that an open state and a close state of the regions 11R and 11L of the shutter 11 are switched over to each other in the time division manner, and outputs a timing control signal for open/close switching to the shutter 11 every region 11R, 11L. In addition, the control portion 20 controls an exposure operation and a signal reading operation in the image sensor 12, and, for example, outputs timing control signals for the exposure start, the exposure end, the signal reading, and the like for each frame to the image sensor 12. Although the details will be described later, these timing control signals which are output to the shutter 11 and the image sensor 12, respectively, are set in such a way that each of the regions 11R and 11L becomes the open state in correspondence to the exposure period of time in each of frames.

Operation in First Embodiment
(1. Basic Operation of Image Pickup Apparatus 1)
In the image pickup apparatus 1 as described above, a light from a subject is transmitted through the image capturing lens 10a, the shutter 11, and the image capturing lens 10b in this order to reach the image sensor 12. With the image sensor 12, captured image data based on the received light beam is acquired and is then output to the signal processing/storing portion 13 in accordance with the control made by the control portion 20. The signal processing/storing portion 13 has various kinds of signal processing portions, and subjects the captured image data input thereto to predetermined signal processing, for example, sorting processing, defect correction processing, demosaic processing, and the like, thereby generating right-hand and left-hand side viewpoint images.

(2. Principles of Acquiring Viewpoint Images)
Next, the principles of acquiring the right-hand and left-hand side viewpoint images will be described with reference to FIGS. 2 to 4. However, FIGS. 2 to 4 are respectively diagrams in each of which the image capturing lenses 10a and 10b, the shutter 11, and the image sensor 12 in the image pickup apparatus 1 are viewed from an upper surface side.

As shown in FIG. 2, in a state in which both the regions 11R and 11L of the shutter 11 are opened (in a state in which division for right-hand and left-hand side optical paths is not carried out), how to reflect three subjects which are located in different positions, respectively, on the same axis on the image sensor 12 is as follows. However, a person A1 located on a focusing surface S1 of each of the image capturing lenses 10a and 10b, a long-distance object (mountain) B1 located deeper than the person A1 (on a side opposite to the image capturing lens 10a), and a near-distance object (flower) C1 located in front of the person A1 (on the side of the image capturing lens 10a) are given as examples of the objects. As described above, in a state in which each of the image capturing lenses 10a and 10b focuses on the person A1, an image of the person A1, for example, is imaged on the center of a sensor surface S3. On the other hand, an image of the long-distance object B1 located out of the focusing surface S1 is imaged in front of the sensor surface S3 (on the side of the image capturing lens 10b). Also, an image of the near-distance object C1 is imaged in the back of the sensor surface S3 (on the side opposite to the image capturing lens 10b). That is to say, the image of the person A1 is reflected as a focused image A2 on the sensor surface S3, and the images of the long-distance object B1 and the near-distance object C1 are reflected as defocused and blurring images B2 and C2 on the sensor surface S3, respectively.

When the optical path is switched between the right-hand side and the left-hand side for those three subjects having the positional relationship as described above, how to reflect the images of the three subjects on the sensor surface S3 is changed as follows. Firstly, when the control portion 20 carries out the control in such a way that the region 11R of the shutter 11 becomes the open state and the region 11L of the shutter 11 becomes the close state, as shown in FIG. 3, the right-hand side half of the optical path becomes a transmission optical path on the pupil surface S2 between the image capturing lenses 10a and 10b, and the left-hand side half of the optical path is light-blocked on the pupil surface S2 between the image capturing lenses 10a and 10b. In this case, with regard to the image of the person A1 focusing on the focusing surface S1, even though the left-hand side is light-blocked (even when the optical path is switched to only the right-hand side half), the image of the person A1 is imaged on the sensor surface S3 similarly to the above case where there is no division of the optical path. On other hand, with regard to the long-distance object B1 and the short-distance object C1 each located out of the focusing surface S1, the respective images which defocuses on the sensor surface S3 are reflected as such images B2' and C2' as to be moved in directions z1 and z2 opposite to each other on the sensor surface S3. As a result, captured image data corresponding to the right-hand side viewpoint image is acquired in the image sensor 12.

On the other hand, when the control portion 20 carries out the control in such a way that the region 11L of the shutter 11 becomes the open state, and the region 11R of the shutter 11 becomes the close state, as shown in FIG. 4, the left-hand side half of the optical path becomes the transmission optical path, and the right-hand side half of the optical path is light-blocked in the pupil surface S2 between the image capturing lenses 10a and 10b. In this case as well, the image of the person A1 focusing on the focusing surface S1 is imaged on the sensor surface S3, and the images of the long-distance object B1 and the near-distance object C1 each of which is located out of the focusing surface S1 are reflected as such images B2" and C2" as to be moved in directions z3 and z4 opposite to each other on the sensor surface S3. However, the movement directions z3 and z4 become opposite to the movement directions z1 and z2, respectively, when the region 11R is set in the open state. As a result, captured image data corresponding to the left-hand side viewpoint image is acquired in the image sensor 12.

As described above, with one image pickup apparatus 1, it is possible to acquire a plurality of viewpoint images (the right-hand and left-hand side viewpoint images in this case). In addition, although when the current optical path is switched over to the other, a shift is generated in the imaging positions of the subjects other than the object having the focusing state, the shift in the imaging positions generates a parallax between the right-hand and left-hand side viewpoint images. The right-hand and left-hand side viewpoint images having such a parallax, for example, are displayed in the time division manner by a display device for stereoscopic viewing, and are offered to the eyes of the human being through the shutter eyeglasses in which a right-hand side eyeglass and a left-hand side eyeglass are controlled in open and close thereof synchronously with the display switching of the right-hand and left-hand side viewpoint images, whereby the human being can feel the stereoscopic effect in the image.

(3. Driving Operation for Shutter 11 and Image Sensor 12)

Figure 5A:
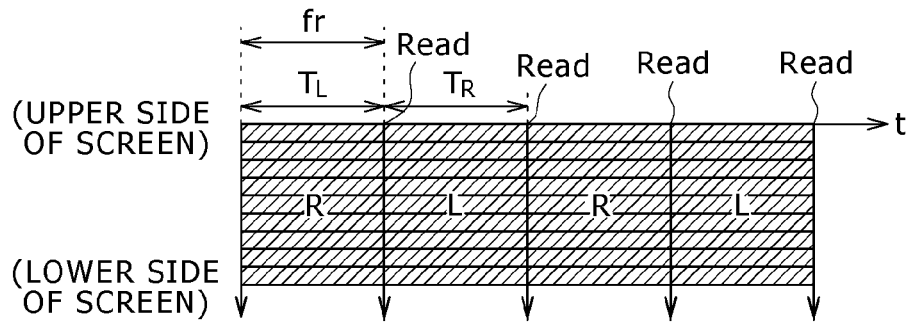
FIGS. 5A and 5B are respectively a drive timing diagram explaining an exposure period of time, and a reading operation in an example image sensor and an example shutter according to Comparative Example 1, and a drive timing diagram explaining open/close switching in a right-hand side region and a left-hand side region of the example shutter in the image sensor and the shutter according to Comparative Example 1.
Figure 5B:
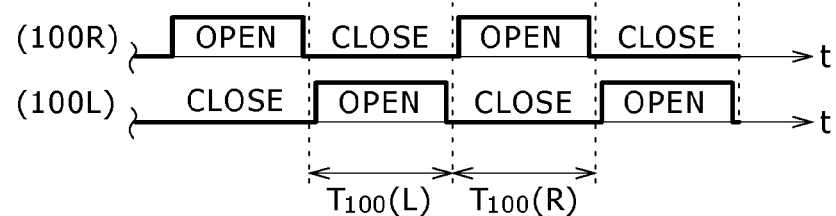
Figure 6A:
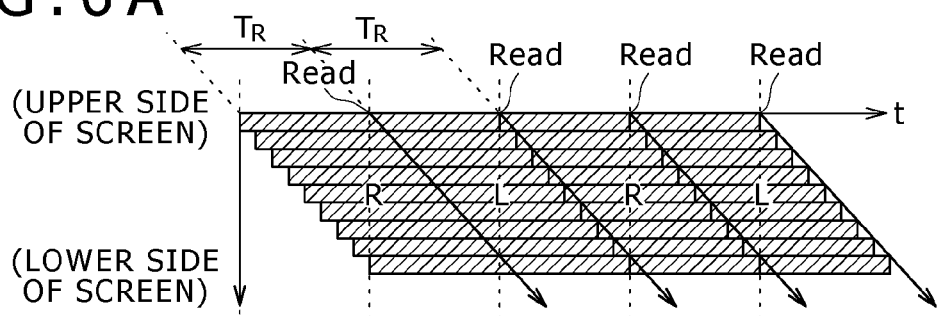
FIGS. 6A and 6B are respectively a drive timing diagram explaining an exposure period of time, and a reading operation in an example image sensor and an example shutter according to Comparative Example 2, and a drive timing diagram explaining open/close switching in a right-hand side region and a left-hand side region of the example shutter in the image sensor and the example shutter according to Comparative Example 2.
Figure 6B:
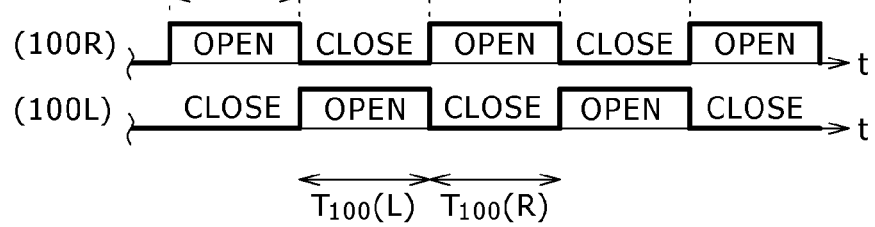
Figure 7A:
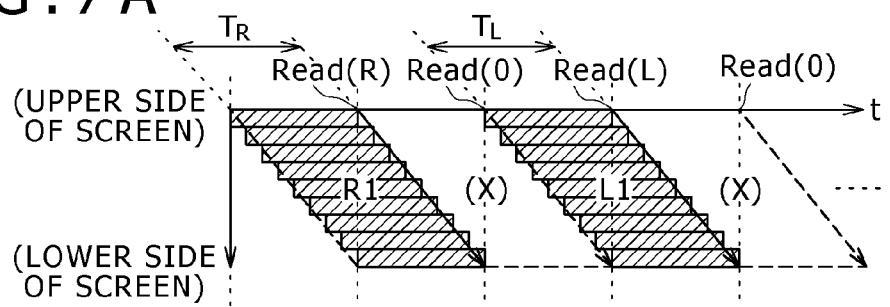
FIGS. 7A and 7B are respectively a drive timing diagram explaining an exposure period of time, and a reading operation in the example image sensor and the example shutter according to the first embodiment, and a drive timing diagram explaining open/close switching in a right-hand side region and a left-hand side region of the shutter in the example image sensor and the example shutter according to the first embodiment.
Figure 7B:
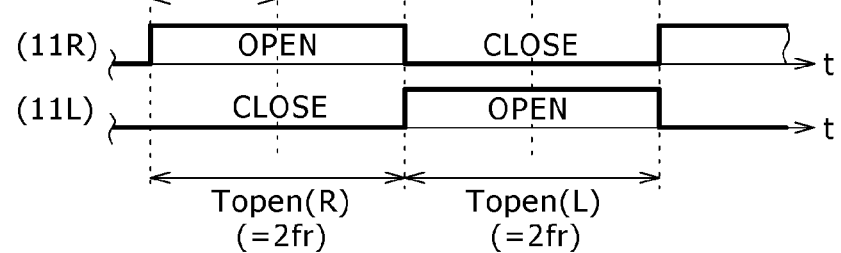

Subsequently, the operation for switching open and close of the shutter 11, and the exposure and reading operation of the image sensor 12 will be described in detail by giving Comparative Examples 1 and 2. FIGS. 5A and 5B show a driving timing for the image sensor CCD and the shutter according to Comparative Example 1, and FIGS. 6A and 6B show a driving timing for the CMOS image sensor and the shutter according to Comparative Example 2. Also, FIGS. 7A and 7B show a drive timing for the CMOS image sensor and the shutter in the first embodiment. However, in FIGS. 5A and 5B to FIGS. 7A and 7B, FIGS. 5A, 6A and 7A each represent the exposure period of time and the reading operation in the CMOS image sensor, and FIGS. 5B, 6B and 7B each represent the switching of open and close in the right-hand side region and the left-hand side region of the shutter. It is noted that in the following description, a frame corresponding to the right-hand side viewpoint image is described either as a frame R or as a frame R1, and a frame corresponding to the left-hand side viewpoint image is described either as a frame L or as a frame L1. In addition, in this specification, a frame period fr of time corresponds to a period of time obtained by dual-dividing one frame period of time in terms of a moving image (2fr=one frame period of time in terms of the moving image). In addition, in FIGS. 5A, 6A and 7A, a slant line portion schematically represents the exposure period of time for each line.

COMPARATIVE EXAMPLE 1

In Comparative Example 1 in which the CCD is used as the image sensor, the screen is collectively driven in the frame-sequential manner. Therefore, as shown in FIG. 5A, in each of the frames R and L, there is no time lag in each of the exposure period $T_L$ of time, and the exposure period $T_R$ of time in the entire picture, and the reading (Read) of the signals is carried out at the same time. For this reason, in Comparative Example 1, the open/close switching between the right-hand side region 10R and the left-hand side region 10L in the shutter 11 has only to be carried out as shown in FIG. 5B. That is to say, the switching is carried out in such a way that the region 100R becomes an OPEN state (the region 100L becomes a CLOSE state) for the exposure period $T_R$ of the time of the frame R, and the region 100L becomes the OPEN state (the region 100R becomes the CLOSE state) for the exposure period $T_L$ of time of the frame L. Specifically, the control is carried out in such a way that the region 100R and the region 100L become the OPEN state and the CLOSE state, respectively, synchronously with the exposure start time of the frame R (the exposure end time of the frame L), and the region 100R and the region 100L become the CLOSE state and the OPEN state, respectively, synchronously with the exposure end time of the frame R (the exposure start time of the frame L). That is to say, in Comparative Example 1, each of the OPEN period $T_{100}$ (R) of time of the region 100R, and the OPEN period $T_{100}$ (L) of time of the region 100L is equal to the frame period fr of time. In this case, each of the OPEN period $T_{100}$ (R) of time of the region 100R, and the OPEN period $T_{100}$ (L) of time of the region 100L is also equal to each of the exposure period $T_R$ of time, and the exposure period $T_L$ of time.

COMPARATIVE EXAMPLE 2

However, when the rolling shutter type CMOS sensor, for example, is used as the image sensor, unlike the case of the CCD sensor described above, for example, the driving is carried out from an upper portion to a lower portion of the screen in the line-sequential manner. That is to say, as shown in FIG. 6A, in each of the frames R and L, the timings for the exposure start and the exposure end, and the timing for the signal reading (Read) differ every line. For this reason, the time lag is generated in each of the exposure period $T_L$ of time, and the exposure period $T_R$ of time depending on the position within the screen. Therefore, when the open and close of the shutter 11 are switched over to each other at the same timing as that in Comparative Example 1, in each of the frames R and L, the current transmission optical path is switched over to the other before end of the exposure for the entire one frame (all the lines). As a result, in each of the frames R and L, the transmitted lights through the regions 100R and 100L are mixedly received, so that the crosstalk is generated (refer to FIG. 6B). For example, it is ideal that in the frame R, only the transmitted light through the region 100R is received in the entire region of the screen. However, actually, the transmitted light through the region 100R is received only on the upper portion side of the screen, and the transmitted light through the region 100L is received on the lower portion side of the screen. In such a manner, when the crosstalk is generated in which both the right-hand side light beam and the left-hand side light beam are mixed with each other in one frame, the parallax amount between a plurality of viewpoint images described above is reduced (the displayed image is close to the planar image), or the stereoscopic effect differs between the upper portion side and the lower portion side of the screen. As a result, it becomes difficult to obtain the described stereoscopic effect.

(Characteristic Operation in First Embodiment)

On the other hand, in the first embodiment, as shown in FIG. 7A, the control portion 20 acquires the frame (the frame R1) acquired at certain time, and the frame L1 for which the exposure of the first line starts in and after end of the reading (Read (R)) for all the lines of the frame R1 (in and after end of the exposure) of the temporally continuous frames as the valid frames, respectively. In other words, the frame after the frame R1, that is, the frame (the frame X between the frames R1 and L1) for which the exposure starts before end of the reading for all the lines of the frame R1 (before end of the exposure for all the lines) is treated as the invalid frame. The frame X, for example, has to be prevented from being output to any of the various kinds of signal processing portions in the signal processing/storing portion 13 after the reading (Read (0)), or the reading (Read (0)) itself has not to be carried out. In addition, as shown in FIG. 7B, the switching for the shutter 11 is controlled in such a way that each of the OPEN period of $T_{OPEN}(R)$ of time for the region 11R, and the OPEN period of $T_{OPEN}(L)$ of time for the region 11L, for example, has a length which is double the frame period fr of time. It is noted that in this case, the frame period fr of time, and each of the exposure period $T_L$ of time, the exposure period $T_R$ of the time are equal to each other. As has been described, in the first embodiment, each of the frames R1, L1, ... which is obtained by the thinning-out for one frame is treated as the valid frame, and each of the OPEN period of $T_{OPEN}(R)$ of time for the region 11R, and the OPEN period of $T_{OPEN}(L)$ of time for the region 11L of the shutter 11 is set as being double the frame period fr of time.

Specifically, the control portion 20 starts the exposure, for example, from the first line of the upper portion of the screen to the final line of the lower portion of the screen in order at time of start of the frame R1. After that, the control portion 20 successively ends the exposure from the first line to the final line and also successively carries out the reading (Read (R)) from the first line to the final line. On the other hand, the control portion 20 switches the state of the region 11R of the shutter 11 from the CLOSE state over to the OPEN state at time of start of the frame R1 described above. After that, at time after a lapse of the period of time which is double the frame period fr of time (at time of start of the frame L1), the control portion 20 switches the state of the region 11R from the OPEN state over to the CLOSE state, and switches the state of the region 11L from the CLOSE state over to the OPEN state. This also applies to the frame L1. That is to say, the control portion 20 starts the exposure for the first line at time of start of the frame L1, and also switches the state of the region 11L from the CLOSE state over to the OPEN state. After that, at time of a lapse of one frame fr of time, the control portion 20 carries out the end of the exposure after the first line, and the reading (Read (L)). After that, at time after a lapse of the two frame period 2fr of time (at time of start of the next frame R2 (not shown)), the control portion 20 switches the state of the region 11L from the OPEN state over to the CLOSE state, and also switches the state of the region 11R from the CLOSE state over to the OPEN state.

As a result, the frame X in which the transmitted lights through the right-hand and left-hand side regions 11R and 11L are mixedly received is excluded. In addition, for the exposure period $T_R$ of time for all the lines of each of the frames R1, the OPEN and CLOSE of the shutter 11 are not switched over to each other (the OPEN state of the region 11R is held as it is, and the CLOSE state of the region 11L is also held as it is). Therefore, the captured image data based on only the transmitted light through the region 11R is acquired in the frame R1. Likewise, the captured image data based on only the transmitted light through the region 11L is acquired in the frame L1. As a result, even when the signal reading in the image sensor 12 is carried out in the line sequential manner (even when the time lag for each line is generated in the exposure period of time or the like in each of the frames), the right-hand side viewpoint image and the left-hand side viewpoint image are generated in each of which the crosstalk is reduced.

It is noted that the number of division of the region (the number of division of the optical path) in the shutter 11 is by no means limited to two, but may be three or more. Even when the number of division of the region is three or more, the OPEN period of time for each of the regions 11R and 11L of the shutter 11 has to be double the frame period fr of time. However, when the number of division of the region is taken to be n(n: integral number of 2 or more), the CLOSE period of time of each of the regions 11R and 11L becomes 2(n−1) times as large as the frame period fr of time. For example, when right-hand and left-hand side two viewpoint images are acquired (in the first embodiment), each of the OPEN periods of time of the regions 11R and 11L becomes 2fr. Also, when three viewpoint images are acquired, each of the OPEN periods of time of three regions into which the region of the shutter 11 is divided becomes 2fr, and each of the CLOSE periods of time of the three regions becomes 4fr. In addition, in this case, although each of the OPEN periods of time of the regions 11R and 11L is set as being double the frame period fr of time, the present disclosure is not necessarily limited to such a case. For example, although the details will be described later, when the global reset function is used, when the exposure period of time itself is made shorter than the frame period fr of time, when the driving timing is made rapid or slow, or the like, each of the OPEN periods of time of the regions 11R and 11L either may be less than two times as small as the frame period fr of time or may be larger than two times as large as the frame period fr of time.

As described above, in the first embodiment, the control portion 20 acquires the frame R1, and the frame L1 for which the exposure starts in and after the exposure for the frame R1 of the temporally continuous frame as the valid frames, respectively. As a result, it is possible to suppress the generation of the phenomenon that the transmitted lights through the regions 11R and 11L are mixed with each other in each of the frames R1 and L1, that is, the generation of the crosstalk. Therefore, a plurality of viewpoint images can be precisely acquired by using the image sensor, for example, the CMOS sensor which is driven in the line-sequential manner. That is especially effective in the case where a plurality of viewpoint images are captured as the moving image. By using such a CMOS sensor, it is possible to construct the system which realizes the low cost, the low power consumption and the high-speed processing as compared with the case where the CCD is used.

Changes of First Embodiment

Next, a description will be given below with respect to other driving examples (Changes 1 to 5) of the shutter and the image sensor in the first embodiment. Each of the driving examples of Changes 1 to 5 which will be described below relates to the timing control when the control portion 20 drives both the shutter 11 and the image sensor 12 in the image pickup apparatus 1 similarly to the case of the first embodiment described above. However, each of Changes 1 to 5 relates to the driving examples especially peculiar to the case where the liquid crystal shutter as will be described below is used as the shutter 11.

Structure of Liquid Crystal Shutter

Figure 8A:
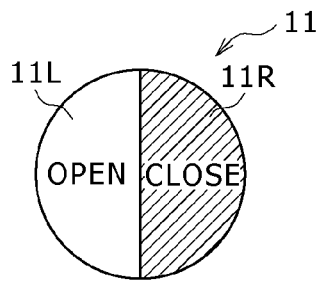
FIGS. 8A and 8B are respectively a schematic diagram showing a planar structure of an example liquid crystal shutter in the case where a left-hand side region is set in an open state (a right-hand side region is a close state), and a schematic diagram showing the planar structure of the example liquid crystal shutter in the case where the right-hand side region is set in the open state (the left-hand side region is the close state).
Figure 8B:
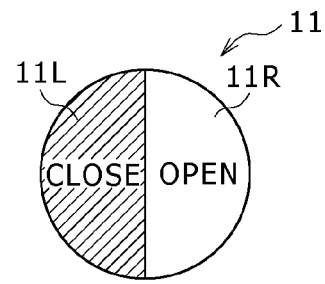
Figure 9:
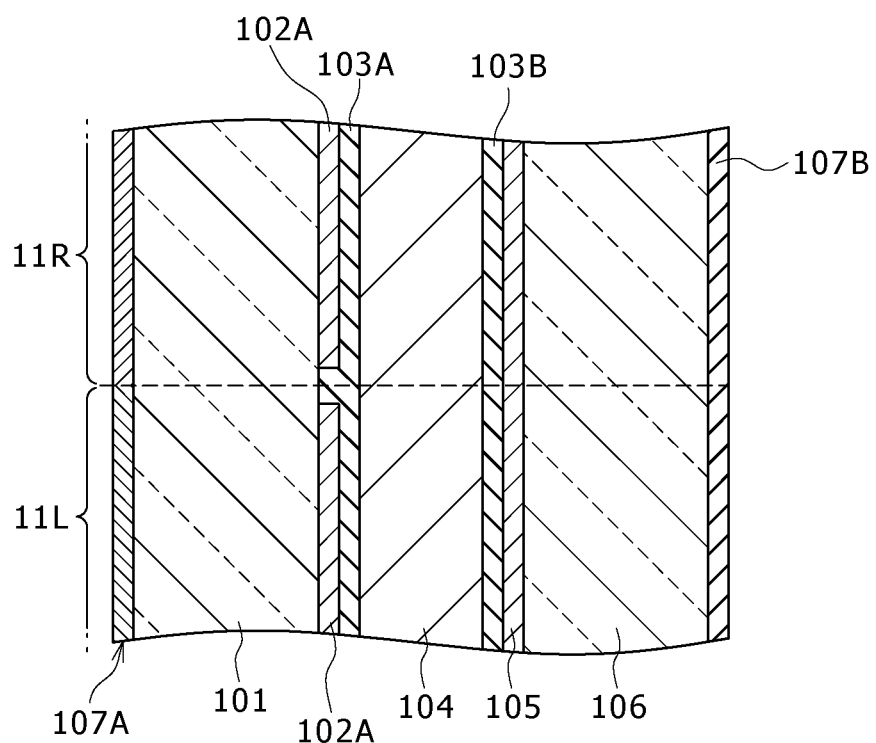
FIG. 9 is a cross sectional view in the vicinity of a boundary between right-hand and left-hand side regions of the example liquid crystal shutter shown in FIGS. 8A and 8B.

FIGS. 8A and 8B schematically show a planar structure of the shutter 11 as the liquid crystal shutter. That is to say, FIG. 8A shows the case where the region 11L is held in the OPEN state (the region 11R is held in the CLOSE state), and FIG. 8B shows the case where the region 11R is held in the OPEN state (the region 11L is held in the CLOSE state). As described above, the shutter 11, for example, has the two right-hand and left-hand side two regions 11R and 11L into which a circular planar shape is divided. FIG. 9 is a cross sectional view in the vicinity of a boundary between the regions 11R and 11L of the shutter 11.

In the shutter 11, a liquid crystal layer 104 is encapsulated into a gap defined between substrates 101 and 106 each made of a glass or the like. Also, a polarizer 107A is stuck to a light incidence side of the substrate 101, and an analyzer 107B is stuck to a light emission side of the substrate 106. An electrode is formed between the substrate 101 and the liquid crystal layer 104, and is divided into a plurality of sub-electrodes 102A (two sub-electrodes 102A corresponding to the regions 11R and 11L in this case). Voltages can be individually supplied through the two sub-electrodes 102A. An electrode 105 common to the regions 11R and 11L is provided on the substrate 106 facing such an electrode 101. An alignment film 103A is formed between the sub-electrode 102A and the liquid crystal layer 104, and an alignment film 103B is formed between the electrode 105 and the liquid crystal layer 104. Each of the sub-electrode 102A, and the electrode 105, for example, is made of an Indium Tin Oxide (ITO), and the liquid crystal layer 104, for example, contains therein liquid crystals having various kinds of display modes such as Super-twisted Nematic (STN), Twisted Nematic (TN), Optical Compensated Bend (OCB), and Ferroelectric Liquid Crystal (FLC). The polarizer 107A and the analyzer 107B selectively transmit predetermined polarized lights, respectively, and are disposed so as to have either a crossed-Nicol state or a parallel-Nicol state.

By adopting such a structure, when a suitable voltage is applied to the liquid crystal layer 104 through the sub-electrode 102A and the electrode 105, the transmittance of the liquid crystal layer 104 can be changed depending on both the magnitude of the applied voltage and the applied time. That is to say, the liquid crystal shutter is used as the shutter 11, whereby the OPEN state and the CLOSE state of the substrate 11 can be switched over to each other in accordance with the voltage control. In addition, the electrode for the voltage application is divided into the two sub-electrodes 102A which can be individually driven, whereby the translucency state and the light blocking state can be alternately switched over to each other every region 11R, 11L. However, it is known that a response speed of such a liquid crystal shutter differs depending on an operation environment (such a temperature). For example, in general, the response speed becomes fast in a phase of a high temperature, and the response speed becomes slow in a phase of a low temperature. In addition, the response characteristics differ between the phase of the transmission and the phase of the light blocking in many cases.

As has been described, the response characteristics of the liquid crystal shutter are readily changed depending on the environment. Thus, when as will be described later, either timing control or driving sequence control corresponding to the response characteristics of the liquid crystal shutter is carried out, it is preferable to detect the response characteristics either directly or indirectly. For example, when the response characteristics are indirectly detected, a temperature sensor which can detect either the temperature of the shutter 11 or the temperature of the peripheral environment of the shutter 11 is provided within the image pickup apparatus 1. In this case, the response characteristics of the shutter 11 can be estimated in accordance with temperature information, on the shutter 11, output from the temperature sensor.

Change 1

Figure 10A:
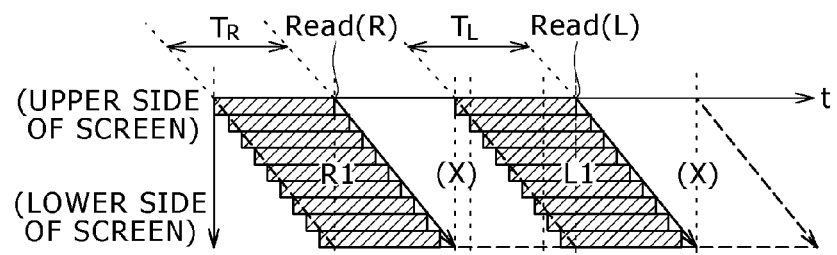
FIGS. 10A, 10B and 10C are respectively a drive timing diagram explaining an exposure period of time and a reading operation in an example image sensor and an example shutter according to Change 1 of the first embodiment, a drive timing diagram explaining open/close switching in a right-hand side region and a left-hand side region of the example shutter in a phase of a low temperature, and a drive timing diagram explaining the open/close switching in the right-hand side region and the left-hand side region of the example shutter in a phase of a high temperature.
Figure 10B:
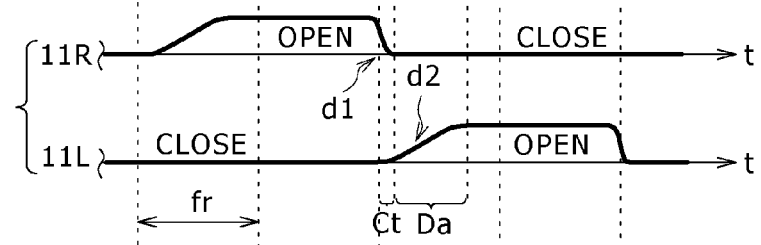
Figure 10C:
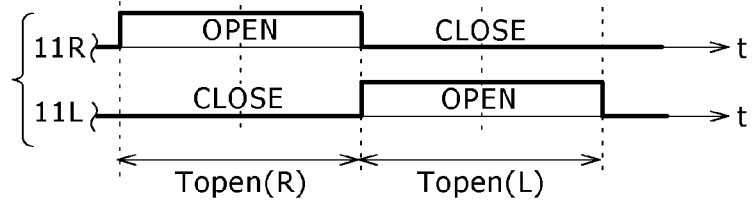
Figure 11A:
FIGS. 11A and 11B are respectively a schematic diagram showing response characteristics in the phase of the high temperature in the example liquid crystal shutter according to Change 1 of the first embodiment, and a schematic diagram showing response characteristics in the phase of the low temperature in the example liquid crystal shutter according to Change 1 of the first embodiment.
Figure 11B:
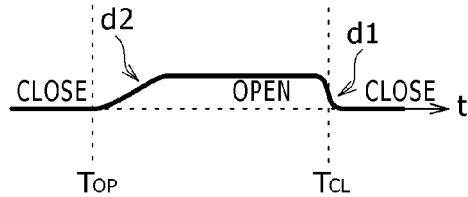

FIGS. 10A, 10B and 10C show respectively drive timings for the image sensor and the shutter in Change 1 of the first embodiment. That is to say, FIG. 10A shows the exposure period of time and the reading in the image sensor, FIG. 10B shows the switching of OPEN and CLOSE of the shutter in the phase of the low temperature, and FIG. 10C shows the switching of OPEN and CLOSE of the shutter in the phase of the high temperature. Also, FIGS. 11A and 11B respectively show the response characteristics of the shutter in Change 1 in the phase of the high temperature, and the response characteristics of the shutter in Change 1 in the phase of the low temperature.

In Change 1, a liquid crystal shutter, for example, is used such that in the phase of the low temperature, the response from the transmission state to the light blocking state is not delayed so much (a property d1), and the response from the light blocking state to the transmission state is remarkably delayed (a property d2). In other words, the shutter 11 has such characteristics that the response speed is slower in a phase of transition from the light blocking state to the transmission state than in a phase of transition from the transmission state to the light blocking state. A liquid crystal shutter which uses a liquid crystal having an STN mode and in which a polarizer and an analyzer are disposed in a crossed-Nicol state, for example, is given as the liquid crystal shutter having such response characteristics.

By using such a liquid crystal shutter, as shown in FIGS. 10A and 10B, in the phase of the low temperature, while the state of the region 11R, 11L is switched from the CLOSE state over to the OPEN state, a period Da of time for which the brightness (quantity of received light) in the upper portion of the screen is reduced is generated in each of the frames R1 and L1 in accordance with the property d2. As a result, however, the brightness is different between the upper portion side and the lower portion side of the screen. In this case, for example, shading correction has to be carried out in later image processing executed by the signal processing/storing portion 13, thereby uniformizing the brightness of the entire screen. On the other hand, while the state of the region 11R, 11L is switched from the OPEN over to the CLOSE state, a short period Ct of time for which the crosstalk is generated has to be short in accordance with the property d1 (the crosstalk is generated only in a part of the upper end of the screen, and in a part of the lower end of the screen). Therefore, in Change 1 as well, the crosstalk can be reduced as compared with the case of Comparative Example 2 described above, and thus it is possible to obtain approximately the same effect as that in the first embodiment described above.

Change 2

Figure 12A:
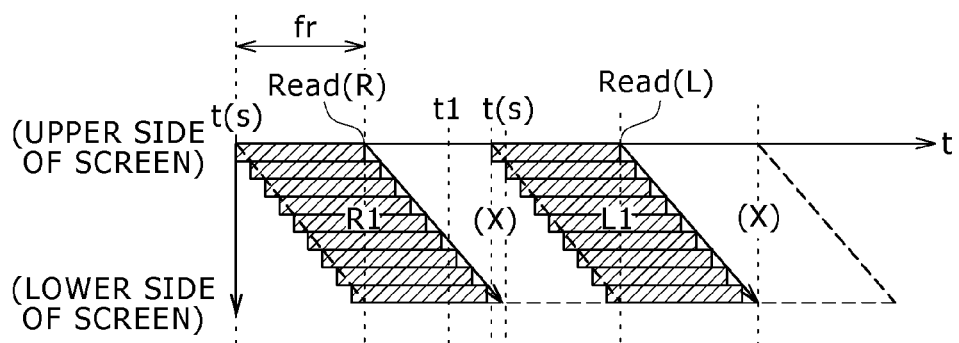
FIGS. 12A and 12B are respectively a drive timing diagram explaining an exposure period of time and a reading operation in an image sensor and a shutter according to Change 2 of the first embodiment, and a drive timing diagram explaining the open/close switching in the right-hand side region and the left-hand side region of the shutter.
Figure 12B:
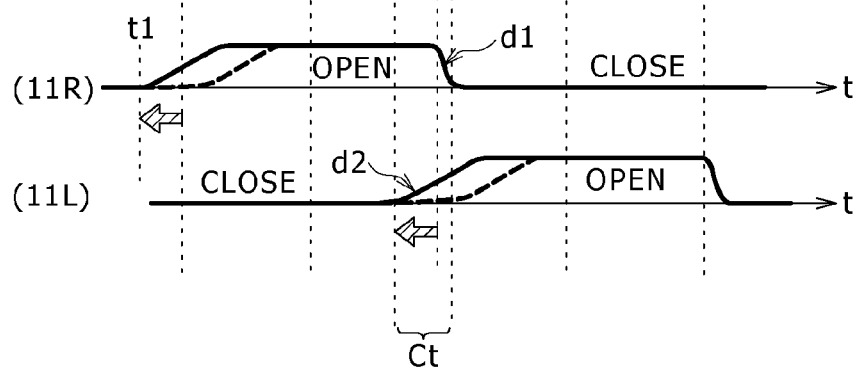

FIGS. 12A and 12B show respectively drive timings for the image sensor and the shutter according to Change 2 of the first embodiment. That is to say, FIG. 12A shows an exposure period of time and reading in the image sensor, and FIG. 12B shows switching of OPEN and CLOSE of the shutter in the phase of the low temperature.

In Change 2 as well, similarly to the case of Change 1, a liquid crystal shutter, for example, is used such that in the phase of the low temperature, the response from the transmission state to the light blocking state is not delayed so much (the property d1), and the response from the light blocking state to the transmission state is remarkably delayed (the property d2). In Change 2, however, the timing for the switching from the CLOSE state to the OPEN state of the region 11R, 11L of the shutter 11 is hastened. In other words, the switching from the CLOSE state to the OPEN state of the region 11R, 11L is carried out at a timing t1 before the frame start time (equal to the timing for start of the exposure) t(s). As a result, although the period Ct of time for which the crosstalk is generated is slightly prolonged as compared with the case of Change 1 described above, the period of time for which the brightness is reduced can be reduced. Therefore, Change 2 of the first embodiment is especially useful for an application such that the brightness is regarded as more important than the crosstalk in the case where the switching of the optical path is carried out by using the liquid crystal shutter.

Change 3

Figure 13A:
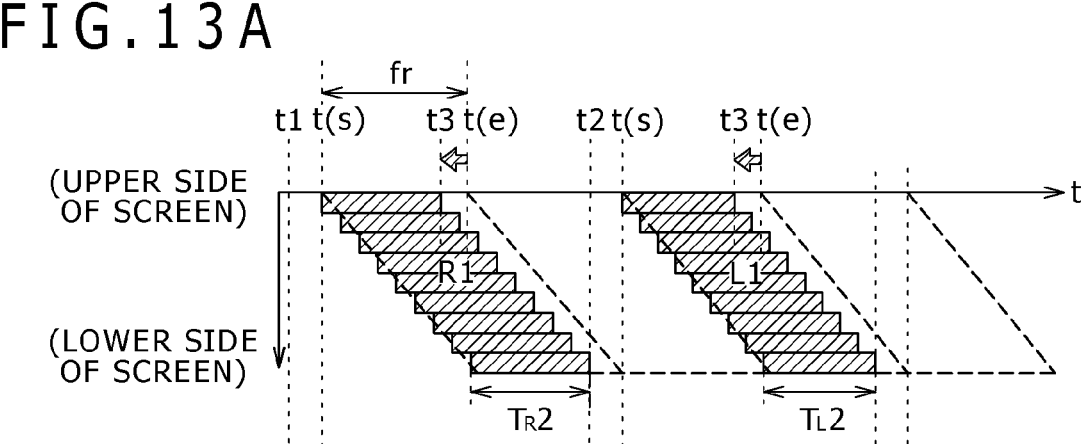
FIGS. 13A and 13B are respectively a drive timing diagram explaining an exposure period of time and a reading operation in an example image sensor and an example shutter according to Change 3 of the first embodiment, and a drive timing diagram explaining the open/close switching in the right-hand side region and the left-hand side region of the example shutter.
Figure 13B:
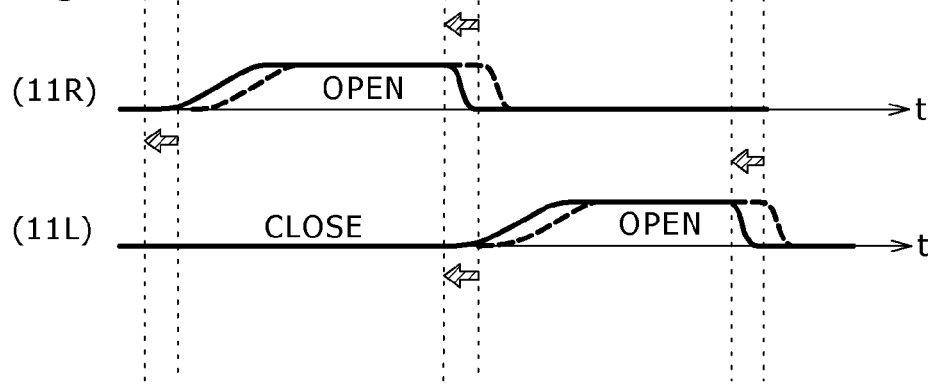

FIGS. 13A and 13B show respectively drive timings for the image sensor and the shutter according to Change 3. That is to say, FIG. 13A shows an exposure period of time and reading in the image sensor, and FIG. 13B shows switching of OPEN and CLOSE of the shutter in the phase of the low temperature.

In Change 3 as well, similarly to the case of Change 1, a liquid crystal shutter, for example, is used such that in the phase of the low temperature, the response from the transmission state to the light blocking state is not delayed so much (the property d1), and the response from the light blocking state to the transmission state is remarkably delayed (the property d2). In addition, similarly to the case of Change 2, the timing from the CLOSE state to the OPEN state of the region 11R, 11L of the shutter 11 is hastened to a timing t1 before the frame start time t(s). In Change 3, however, in addition thereto, the timing from the OPEN state to the CLOSE state of the region 11R, 11L of the shutter 11 is hastened, and also the timing for end of the exposure is hastened. In other words, the switching from the OPEN state to the CLOSE state is carried out at a timing t2 before the subsequent time t(s) of start of the frame, and also the exposure for the first line ends at a timing t3 before the timing t(e) for end of the frame period of time. For this reason, in Change 3, each of the exposure period $T_R2$ of time for the right-hand side frame R1, and the exposure $T_L2$ of time for the left-hand side frame L1 is set shorter than the frame period fr of time.

Even by using such driving timings, it is possible to obtain approximately the same effect as that in each of the first embodiment and its Change 2 described above. In addition, both the timing for the switching from the OPEN state to the CLOSE state of the region 11R, 11L, and the timing for end of the exposure are hastened, thereby making it possible to avoid the crosstalk which is easily generated between the right-hand side frame R1 and the left-hand side frame L1.

Change 4

Figure 14A:
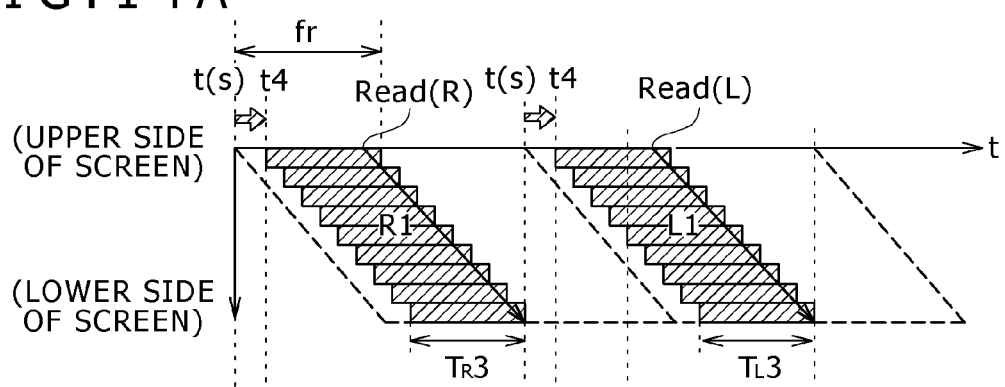
FIGS. 14A and 14B are respectively a drive timing diagram explaining an exposure period of time and a reading operation in an example image sensor and an example shutter according to Change 4 of the first embodiment, and a drive timing diagram explaining the open/close switching in the right-hand side region and the left-hand side region of the example shutter.
Figure 14B:
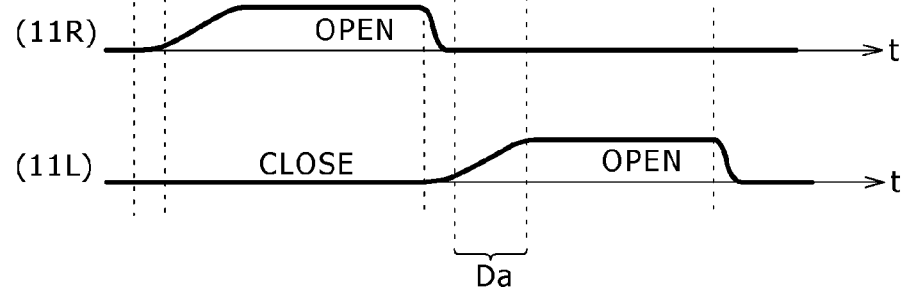

FIGS. 14A and 14B show respectively drive timings for the image sensor and the shutter according to Change 4 of the first embodiment. That is to say, FIG. 14A shows an exposure period of time and reading in the image sensor, and FIG. 14B shows switching of OPEN and CLOSE of the shutter in the phase of the low temperature.

In Change 4 as well, similarly to the case of Change 1, a liquid crystal shutter, for example, is used such that in the phase of the low temperature, the response from the transmission state to the light blocking state is not delayed so much (the property d1), and the response from the light blocking state to the transmission state is remarkably delayed (the property d2). In Change 4, however, the timing for start of the exposure is slowed. In other words, the exposure for the first line starts at a timing t4 after the time t(s) for start of the frame. For this reason, in Change 4, each of the exposure period $T_R3$ of time for the right-hand side frame R1, and the exposure $T_L3$ of time for the left-hand side frame L1 is set shorter than the frame period fr of time. Even by using such driving timings, it is possible to obtain approximately the same effect as that in the first embodiment described above. In addition, although a period Da of time is generated for which the brightness is reduced in the upper portion side of the screen, it is possible to avoid the crosstalk which is easily generated between the right-hand side frame R1 and the left-hand side frame L1.

It is noted that in addition to the timing control described above in Changes 2 to 4 of the first embodiment, various kinds of timing control are possible from viewpoints of the response characteristics of the liquid crystal shutter, the crosstalk, and the brightness. For example, it may also be adopted that the timings for OPEN and CLOSE of the shutter are not only hastened, but also slowed, or both the timing for start of the exposure, and the timing for end of the exposure are changed.

Change 5

Figure 15A:
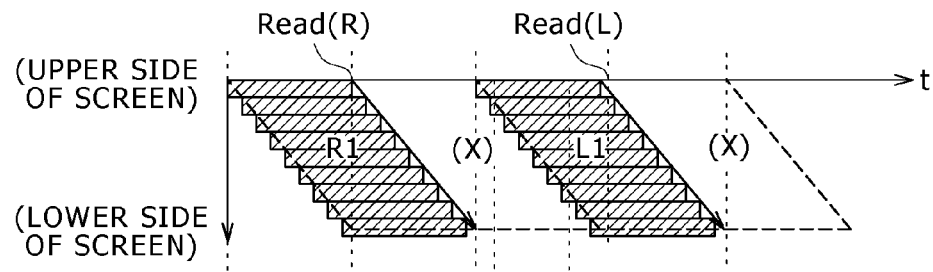
FIGS. 15A, 15B and 15C are respectively a drive timing diagram explaining an exposure period of time and a reading operation in an example image sensor and an example shutter according to Change 5 of the first embodiment, a drive timing diagram explaining open/close switching in a right-hand side region and a left-hand side region of the example shutter in a phase of a low temperature, and a drive timing diagram explaining the open/close switching in the right-hand side region and the left-hand side region of the example shutter in a phase of a high temperature.
Figure 15B:
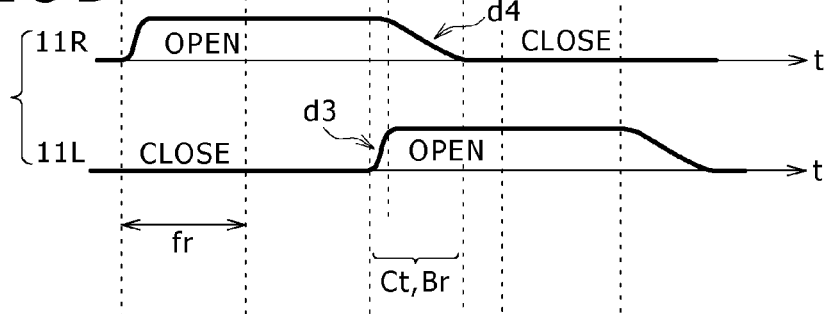
Figure 15C:
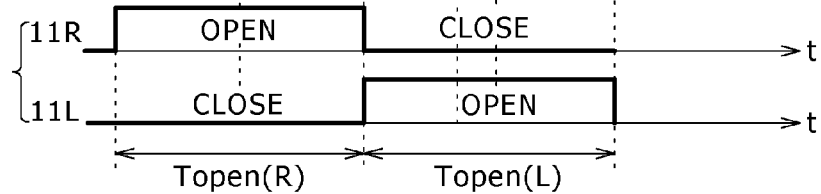
Figure 16A:
FIGS. 16A and 16B are respectively a schematic diagram showing response characteristics in the phase of the high temperature in the example liquid crystal shutter according to Change 5 of the first embodiment, and a schematic diagram showing response characteristics in the phase of the low temperature in the example liquid crystal shutter according to Change 5 of the first embodiment.
Figure 16B:
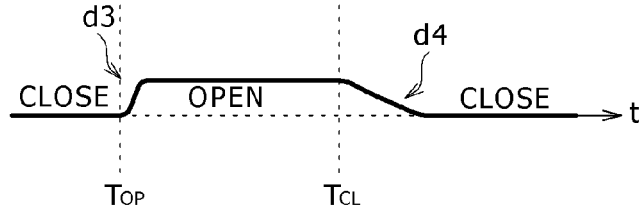

FIGS. 15A, 15B and 15C show respectively drive timings for the image sensor and the shutter in Change 5 of the first embodiment. That is to say, FIG. 15A shows the exposure period of time and the reading in the image sensor, FIG. 15B shows the switching of OPEN and CLOSE of the shutter in the phase of the low temperature, and FIG. 15C shows the switching of OPEN and CLOSE of the shutter in the phase of the high temperature. Also, FIGS. 16A and 16B respectively show the response characteristics of the shutter in Change 5 in the phase of the high temperature, and the response characteristics of the shutter in Change 5 in the phase of the low temperature.

In Change 5, a liquid crystal shutter, for example, is used such that in the phase of the low temperature, the response from the light blocking state to the transmission state is not delayed so much (a property d3), and the response from the transmission state to the light blocking state is remarkably delayed (a property d4). In other words, the shutter 11 has such characteristics that the response speed is slower in a phase of transition from the transmission state to the light blocking state than in a phase of transition from the light blocking state to the transmission state. A liquid crystal shutter which uses a liquid crystal having an STN mode and in which a polarizer and an analyzer are disposed in a crossed-Nicol state, for example, is given as the liquid crystal shutter having such response characteristics.

By using such a liquid crystal shutter, as shown in FIGS. 15A and 15B, in the phase of the low temperature, a period Ct, Br of time is generated for which the crosstalk is generated and also the brightness is increased. As a result, however, the brightness is different between the upper portion side and the lower portion side of the screen. In this case, for example, shading correction has to be carried out in later image processing executed by the signal processing/storing portion 13, thereby uniformizing the brightness of the entire screen. Although in Change 5, the crosstalk is slightly generated, Change 5 is useful for an application such that the brightness is regarded as more important than reduction of the crosstalk.

The technique with which the timing for switching of OPEN and CLOSE of the shutter, the timing for start of the exposure, and the timing for end of the exposure are hastened or slowed from the viewpoints of the crosstalk and the brightness as described in Changes 2 to 4 can be applied to Change 5 as well described above.

Second Embodiment

Figure 17A:
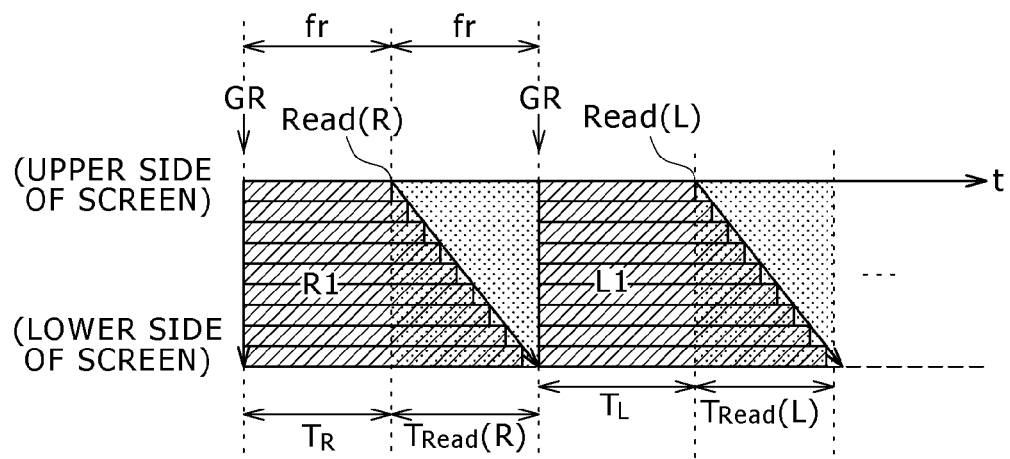
FIGS. 17A and 17B are respectively a drive timing diagram explaining an exposure period of time and a reading operation in an example image sensor and an example shutter according to a second embodiment, and a drive timing diagram explaining the open/close switching in the right-hand side region and the left-hand side region of the example shutter.
Figure 17B:
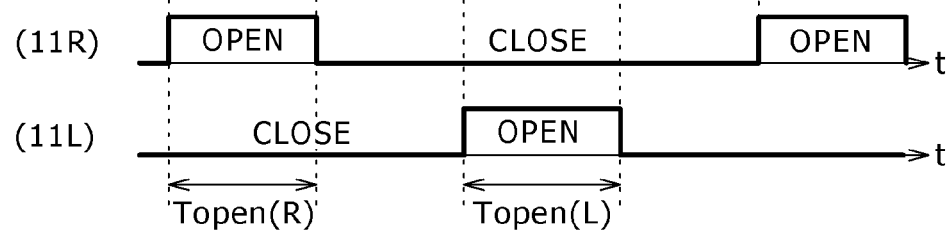

FIGS. 17A and 17B show respectively drive timings for the image sensor and the shutter in an image pickup apparatus according to a second embodiment. That is to say, FIG. 17A shows an exposure period of time and reading in the image sensor, and FIG. 17B shows switching of OPEN and CLOSE of the shutter in the phase of the low temperature. The driving operation in the second embodiment relates to the timing control when the control portion 20 drives the shutter 11 and an image sensor in the image pickup apparatus 1 similarly to the case of the first embodiment described above. However, the second embodiment is different in function of the image sensor from the first embodiment described above.

The image sensor in the second embodiment is a rolling shutter type image pickup element (such as the CMOS sensor) in which the signals are successively read out from a plurality of photodiodes disposed in a matrix in the line-sequential manner similarly to the case of the image sensor 12 in the first embodiment described above. However, a global reset function is added to the image sensor in the second embodiment, and thus the accumulated electric charges are reset at a predetermined timing (the state in which there is no accumulated electric charge is provided). The start of the exposure can be collectively carried out for the entire screen even in the rolling shutter type CMOS sensor or the like by the global reset function.

For example, as shown in FIG. 17A, the control portion 20 carries out the global reset GR at the time for start of the frame R1, thereby starting the exposure at once. After that, the exposure of the first line ends at the time after a lapse of one frame period fr of time, and the reading (Read (R)) starts from the first line. On the other hand, as shown in FIG. 17B, the state of the region 11R of the shutter 11 is switched from the CLOSE state over to the OPEN state synchronously with the timing for execution of the global reset GR described above (the time of start of the frame R1). After that, the state of the region 11R is switched from the OPEN state over to the CLOSE state at the time after a lapse of one frame period fr of time. Also, the global reset GR is carried out again at the time of end of the reading (Read (R)) for all the lines of the frame R1 (at the time of start of the frame L1). Then, the state of the region 11L of the shutter 11 is switched from the CLOSE state over to the OPEN state, and the exposure and the reading (Read (L)) for the frame L1 are carried out similarly to the case of the frame R1 described above. However, the region 11L and the region 11R of the shutter 11 are each set in the CLOSE state for the period $T_{Read}$(R) of time for the frame R1, and the period $T_{Read}$(L) of time for the frame L1, respectively. As a result, the frame R1 and the frame L1 are acquired as the valid frames, respectively.

That is to say, in the second embodiment, the start of the exposure is collectively carried out by utilizing the global reset function, and the state of the region 11R (the region 11L) is switched from the OPEN state over to the CLOSE state, thereby collectively carrying out the substantial exposure end. It is noted that although actually, even for the reading period $T_{Read}$(R) of time and the reading period $T_{Read}$(L) of time after switching of the shutter from the OPEN state over to the CLOSE state, the exposure continues in each of the lines until completion of the reading, no accumulated electric charge is generated because the entire region of the shutter is closed for this period of time. As a result, no time lag is generated between the substantial exposure periods $T_R$, $T_L$ of time in each of the frames, and thus the image on the entire screen is photographed at the same time. Of course, no crosstalk is generated between the right-hand side viewpoint image and the left-hand side viewpoint image. Therefore, although the line-sequential drive type image sensor is used, it is possible to photograph the image containing therein no distortion similarly to the case where the frame-sequential drive type image sensor is used. This is also applied to the case where a subject is moved at a high speed. Therefore, it is possible to obtain the effect which is either equaling or surpassing to that in the first embodiment described above.

Changes of Second Embodiment

Next, a description will be given below with respect to other driving examples (Changes 1 to 3) of the shutter and the image sensor in the second embodiment. Each of the driving examples, i.e., Changes 1 to 3 which will be described below relates to the timing control when the control portion 20 drives the shutter 11 and the image sensor 12 having the global reset function in the image pickup apparatus 1 similarly to the case of the first embodiment described above. However, each of Changes 1 to 3 of the second embodiment relates to the driving operation especially peculiar to the case where the liquid crystal shutter which was described in Changes 1 to 5 of the first embodiment described above is used as the shutter 11.

Change 1

Figure 18A:
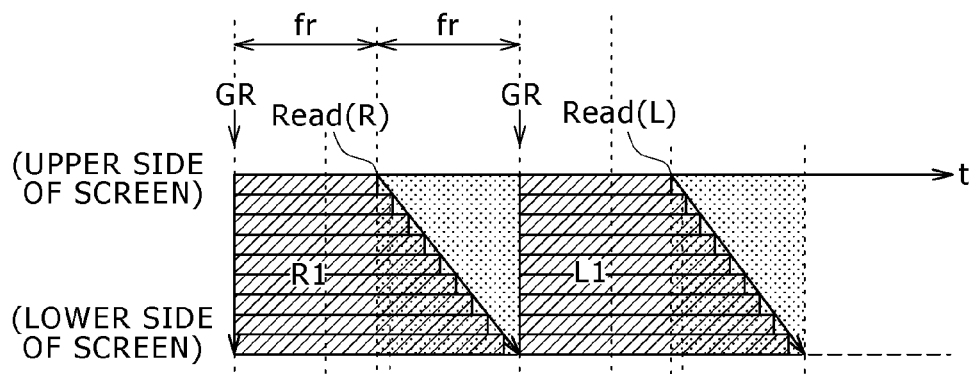
FIGS. 18A, 18B and 18C are respectively a drive timing diagram explaining an exposure period of time and a reading operation in an example image sensor and an example shutter according to Change 1 of the second embodiment, a drive timing diagram explaining open/close switching in a right-hand side region and a left-hand side region of the example shutter in a phase of a low temperature, and a drive timing diagram explaining the open/close switching in the right-hand side region and the left-hand side region of the example shutter in a phase of a high temperature.
Figure 18B:
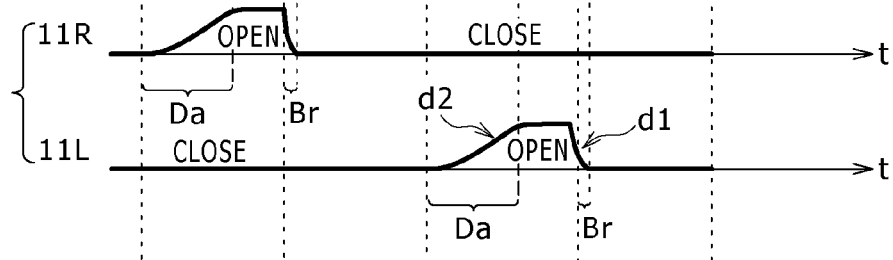
Figure 18C:
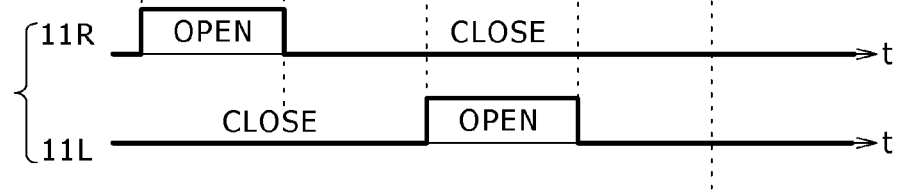

FIGS. 18A, 18B and 18C respectively show the drive timings for the image sensor and the shutter according to Change 1 of the second embodiment. That is to say, FIG. 18A shows the exposure period of time and the reading in the image sensor, FIG. 18B shows the switching of OPEN and CLOSE of the shutter in the phase of the low temperature, and FIG. 18C shows the switching of OPEN and CLOSE of the shutter in the phase of the high temperature.

In Change 1, similarly to the case of Change 1 of the first embodiment, a liquid crystal shutter, for example, is used such that in the phase of the low temperature, the response from the transmission state to the light blocking state is not delayed so much (the property d1), and the response from the light blocking state to the transmission state is remarkably delayed (the property d2). By using such a liquid crystal shutter, as shown in FIGS. 18A and 18B, in the phase of the low temperature, while the CLOSE state of the region 11R, 11L is switched over to the OPEN state, the period Da of time for which the quantity of received light is reduced during the exposure period of time of each of the frames R1 and L1 is generated in accordance with the property d2. However, as described in the second embodiment, because no time lag is generated for the exposure period of time by the global shutter function, not a part of the picture becomes dark, but the entire picture becomes uniformly dark. For this reason, the brightness of the captured image is not lacking in uniformity, and thus it is unnecessary to carry out the shading correction or the like. It is noted that while the OPEN state of the region 11R, 11L is switched over to the CLOSE state, an extension Bd of the exposure period of time is slightly generated in each of the frames R1 and L1 in accordance with the property d1. However, because the slight extension results in that the brightness of the upper end of the sensor is slightly different from that of any other region of the screen, the slight extension does not practically become a problem.

In the case where the global reset function is used in such a manner, even when the liquid crystal shutter in which the response characteristics are easily changed is used as the shutter 11, the crosstalk is hardly generated. Therefore, even when the measures are not specially taken to cope with the temperature change in terms of the system, the viewpoint images can be precisely captured.

Change 2

Figure 19A:
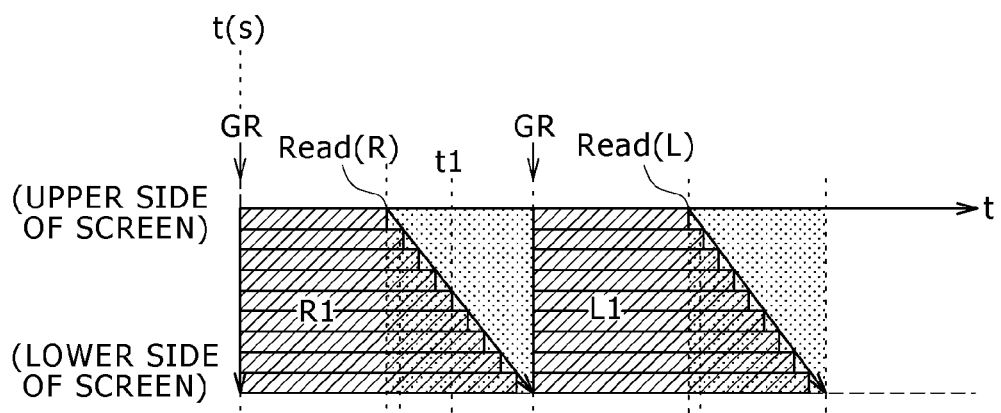
FIGS. 19A and 19B are respectively a drive timing diagram explaining an exposure period of time and a reading operation in an example image sensor and an example shutter according to Change 2 of the second embodiment, and a drive timing diagram explaining the open/close switching in the right-hand side region and the left-hand side region of the example shutter.
Figure 19B:
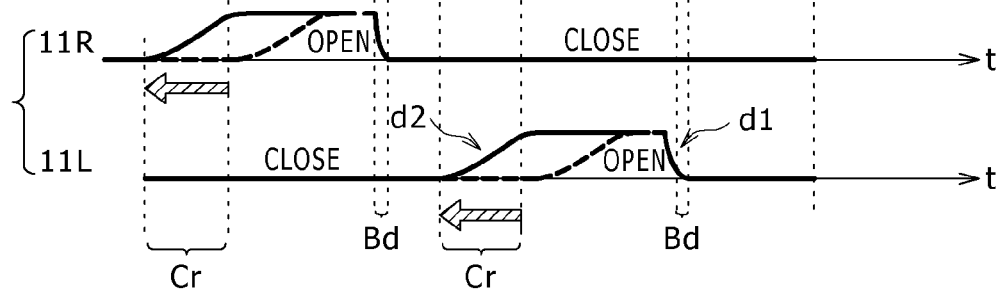

FIGS. 19A and 19B show respectively drive timings for the image sensor and the shutter in an image pickup apparatus according to Changer 2 of second embodiment. That is to say, FIG. 19A shows an exposure period of time and reading in the image sensor, and FIG. 19B shows switching of OPEN and CLOSE of the shutter in the phase of the low temperature.

In Change 2 as well, a liquid crystal shutter, for example, is used such that in the phase of the low temperature, the response from the transmission state to the light blocking state is not delayed so much (the property d1), and the response from the light blocking state to the transmission state is remarkably delayed (the property d2) similarly to the cases of Change 1 of the first embodiment, and Change 1 of the second embodiment. However, in Change 2, the timing at which the CLOSE state of the region 11R, 11L of the shutter 11 is switched over to the OPEN state is hastened. In other words, the CLOSE state of the region 11R, 11L of the shutter 11 is switched over to the OPEN state at the timing t1 before the time of start of the frame (which is equal to each of the timing for start of the exposure, and the timing for the global reset GR in this case) t(s). As a result, although the period Ct of time for which the crosstalk is generated is generated, the period of time for which the brightness is reduced can be reduced as compared with the case of Change 1. Therefore, Change 2 is especially useful for the application such that the brightness is regarded as more important than the reduction of the crosstalk when the optical path is switched by using the liquid crystal shutter.

Change 3

Figure 20A:
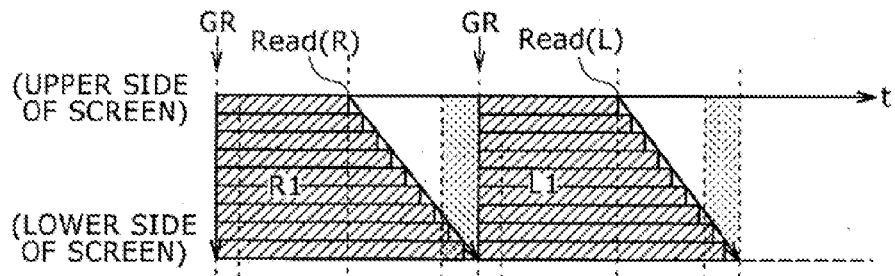
FIGS. 20A, 20B and 20C are respectively a drive timing diagram explaining an exposure period of time and a reading operation in an example image sensor and an example shutter according to Change 3 of the second embodiment, a drive timing diagram explaining open/close switching in a right-hand side region and a left-hand side region of the example shutter in a phase of a low temperature, and a drive timing diagram explaining the open/close switching in the right-hand side region and the left-hand side region of the example shutter in a phase of a high temperature.
Figure 20B:
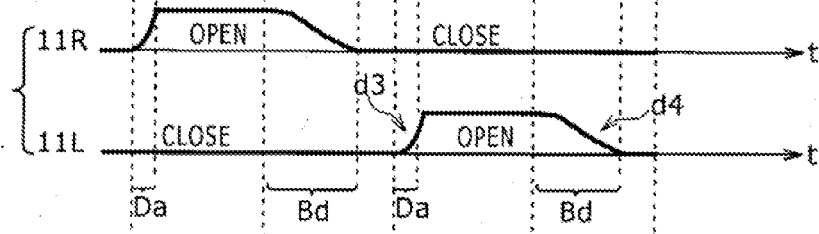
Figure 20C:
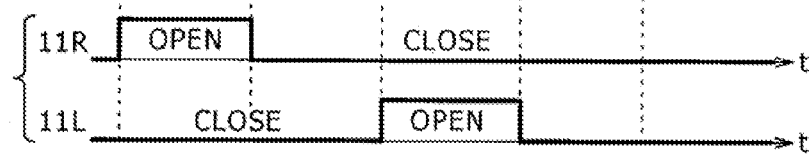

FIGS. 20A, 20B and 20C respectively show the drive timings for the image sensor and the shutter according to Change 3 of the second embodiment. That is to say, FIG. 20A shows the exposure period of time and the reading in the image sensor, FIG. 20B shows the switching of OPEN and CLOSE of the shutter in the phase of the low temperature, and FIG. 20C shows the switching of OPEN and CLOSE of the shutter in the phase of the high temperature.

In Change 3, a liquid crystal shutter, for example, is used such that in the phase of the low temperature, the response from the light blocking state to the transmission state is not delayed so much (the property d3), and the response from the transmission state to the light blocking state is remarkably delayed (the property d4). By using such a liquid crystal shutter, as shown in FIGS. 20A and 20B, in the phase of the low temperature, while the OPEN state of the region 11R, 11L of the shutter 11 is switched over to CLOSE state, the extension Bd of the exposure period of time is generated in accordance with the property d4. As a result, one of the upper portion and the lower portion of the screen becomes bright as if the gradation is applied from the upper portion to the lower portion of the screen. It is noted that the gradation may also be uniformized by carrying out the shading correction. In addition, while the CLOSE state of the region 11R, 11L of the shutter 11 is switched over to the OPEN state, the period Da of time for which the quantity of received light is slightly reduced is generated in each of the regions 11R and 11L. However, because the slight period Da of time is nothing to generate the unevenness of the brightness in the screen, the slight period Da of time does not practically become a problem. In addition, similarly to the case of Change 1, because the crosstalk is hardly generated, even when the measures are not specially taken to cope with the temperature change in terms of the system, the viewpoint images can be precisely captured.

It is noted that even when the liquid crystal shutter is used and also the global reset function is utilized, in addition to the driving examples described above, the timing for switching of OPEN and CLOSE of the shutter, and the timing for start of the exposure (global reset) may be hastened or slowed from the viewpoints of the crosstalk and the brightness.

Change 4

Figure 21:
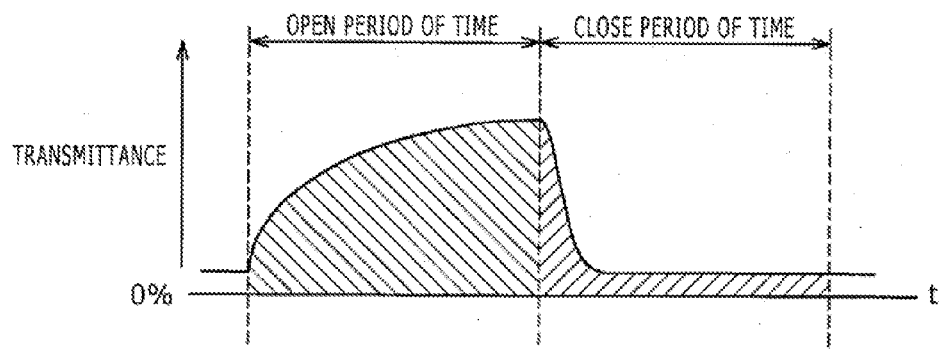
FIG. 21 is a graphical representation showing a transmittance change in the example liquid crystal shutter in Change 4 of the second embodiment.

Although in each of Changes 1 to 5 of the first embodiment, and Changes 1 to 3 of the second embodiment, the timing control corresponding to the response characteristics of the liquid crystal shutter have been described in the case where the liquid crystal shutter is used as the shutter 11, for example, the driving sequence may also be controlled in the manner as will be described below. Here, FIG. 21 shows a transmittance change (response characteristics) in the liquid crystal shutter. As previously stated, the liquid crystal shutter changes its transmittance in accordance with the voltage control. Specifically, the liquid crystal shutter is driven by a voltage holding such a sequence that the OPEN state (transmission state) and the CLOSE state (light blocking state) are alternately repeated in the time division manner. In Change 4, the control portion 20 holds a plurality of driving sequences for the liquid crystal shutter. Thus, the control portion 20 carries out the switching for these driving sequences in accordance with the response characteristics of the liquid crystal shutter so that the response speed and a OPEN-phase-average transmittance get desired values, respectively. It is noted that the OPEN-phase-average transmittance is an average value of the transmittance for the OPEN period of time in the driving state in which OPEN and CLOSE of the shutter are periodically repeated.

For example, when in the phase of the low temperature, the response speed is reduced, the voltage holding such a driving sequence as to increase the response speed is applied to the liquid crystal shutter. Conversely, when in the phase of the high temperature, the response speed is sufficiently high, the voltage holding such a driving sequence as to increase the OPEN-phase-average transmittance is applied to the liquid crystal shutter. The number of such driving sequences may be two (two stage switching), or three or more multiple switching may also be adopted. In addition, as previously stated, the response characteristics are detected by some sort of detecting section, and the driving sequence corresponding to the detection result is selected, whereby the liquid crystal shutter can be caused to carry out the optimal operation under the various environments. As a result, in a plurality of viewpoint images, the generation of the crosstalk can be suppressed, or the brightness can be increased. Thus, it is possible to obtain approximately the same effect as that in the case where the timing control as described in each of Changes 1 to 5 of the first embodiment, and Changes 1 to 3 of the second embodiment is carried out.

Examples of Image Processing

Next, a description will be given with respect to suitable examples of image processing in the image pickup apparatus 1 for acquiring a plurality of viewpoint images as described above. In particular, there is given processing which is effective when an object of image capturing is a moving image accompanied by a continuous motion (when the frames R1 and L1 are alternately, repetitively acquired in the time direction manner). In addition, the signal processing/storing portion 13 carries out this sort of image processing, for example, in accordance with the control made by the control portion 20.

(1. Motion Blur Processing)

Figure 22:
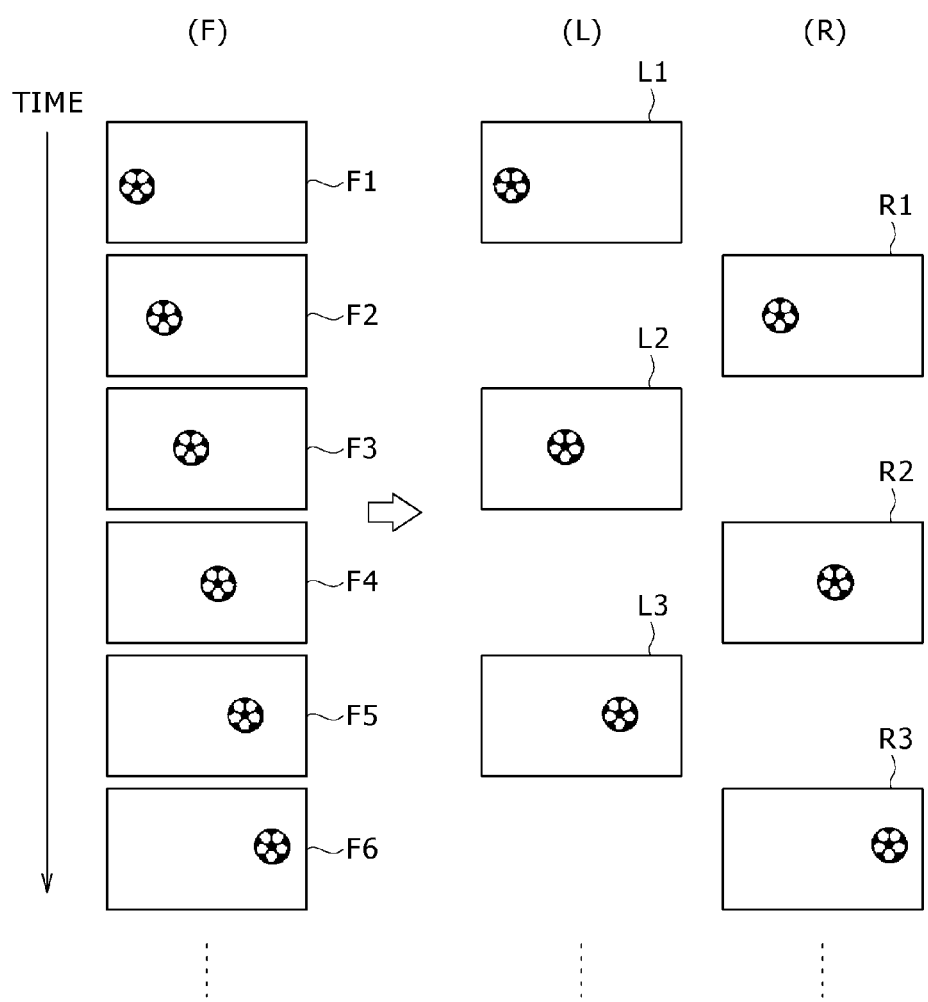
FIG. 22 is a schematic diagram showing an example of left-hand side viewpoint images and right-hand side viewpoint images in a phase of capturing a moving image.

FIG. 22 is a schematic diagram showing a state in which images (original image F: F1, F2, F3, . . . ) captured at a normal moving image frame rate, and examples of left-hand side images (L: L1, L2, L3, . . . ) and right-hand side images (R: R1, R2, R3, . . . ) each corresponding thereto are arranged along a time axis. In the image pickup apparatus 1, the left-hand side image (L) and the right-hand side image (R) are alternately acquired in the time division manner. Therefore, such an image group that one frame (one field) in the original image (F) is thinned out in terms of time is obtained as each of the left-hand side images (L) and the right-hand side images (R).

Figure 23:
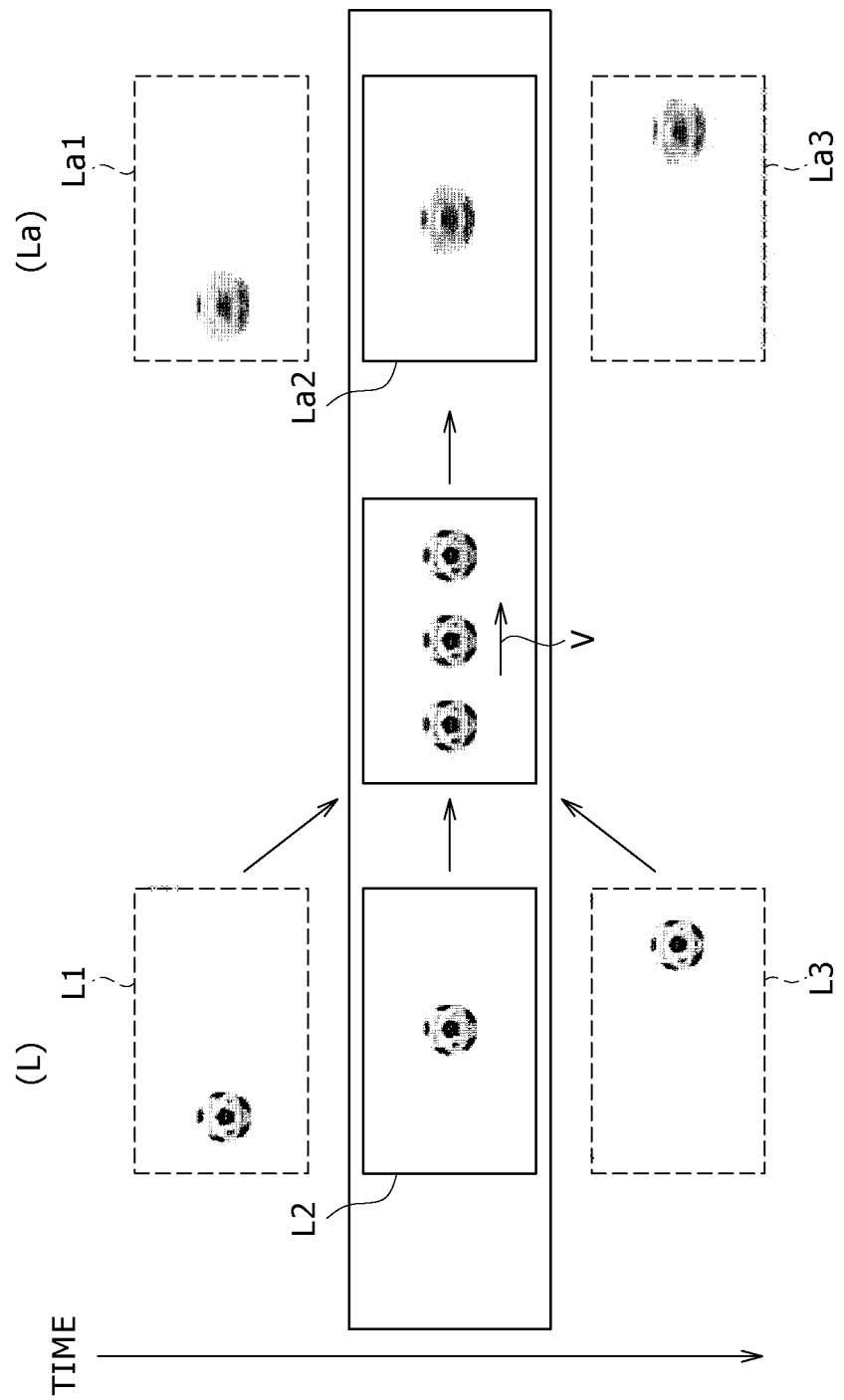
FIG. 23 is an example schematic diagram showing Example 1 of image processing (motion blur processing).

For this reason, although there is especially no problem in the case of the subject which is slow in motion, in the case of the subject which is rapid in motion, so-called jerkiness (the phenomenon viewed as scanning) becomes conspicuous. Because such jerkiness becomes a factor causing the eye stain, the jerkiness is preferably excluded. Then, for example, it is better to execute the motion blur processing as will be described below. That is to say, firstly, the left-hand side viewpoint images (L: L1, L2, L3, ... ) and the right-hand side viewpoint images (R: R1, R2, R3, ... ) the data on which is stored, as shown in FIG. 22, are rearranged into an image column composed of only the left-hand side viewpoint images, and an image column composed of only the right-hand side viewpoint images, respectively. After that, for example, as shown in FIG. 23, attention, for example, is paid to the image L2 in each of the image columns (the image column composed of the left-hand side viewpoint images is given in this case), and a motion vector V of the subject within the phase of the image L2 is calculated in accordance with both the image L1 temporally following the image L2, and the image L3 temporally followed by the image L2. The image of the subject is opaque along the direction of the motion vector V thus calculated in the images L1 to L3, thereby generating left-hand side viewpoint images (La: La1, La2, La3, ... ) after completion of the motion blur processing. As a result, even when the subject which is rapid in motion is captured, it is possible to reduce the influence of the jerkiness. In addition thereto, for example, a technique for changing ratios of the images L1 to L3 (for example, the ratio of the image L1 is set as 100, and the ratio of each of the images L2 and L3 is set as 50), thereby blending the resulting images L1 to L3, or the like is given as the motion blur processing.

(2. Image Interpolation Processing)

Figure 24:
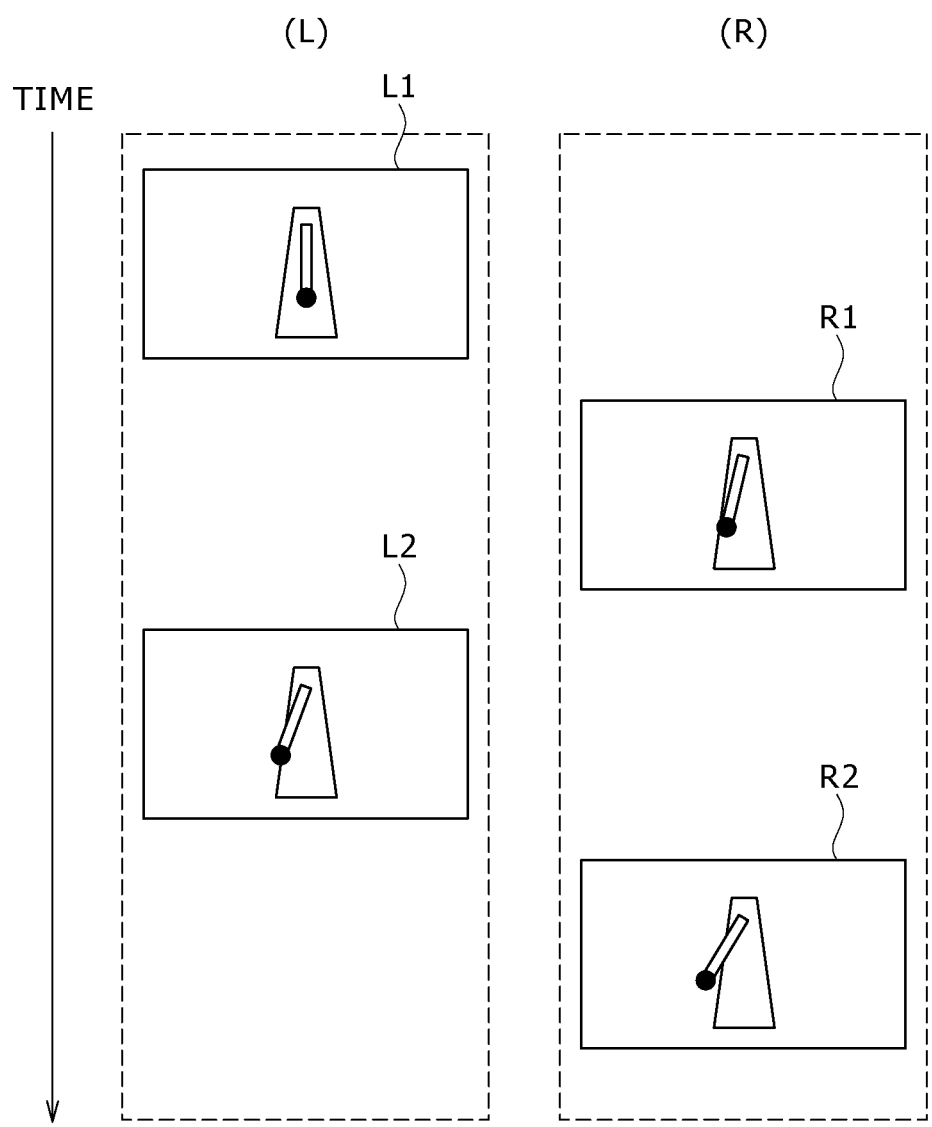
FIG. 24 is a schematic diagram showing an example of left-hand side viewpoint images and right-hand side viewpoint images in a phase of capturing an example moving image.
Figure 25:
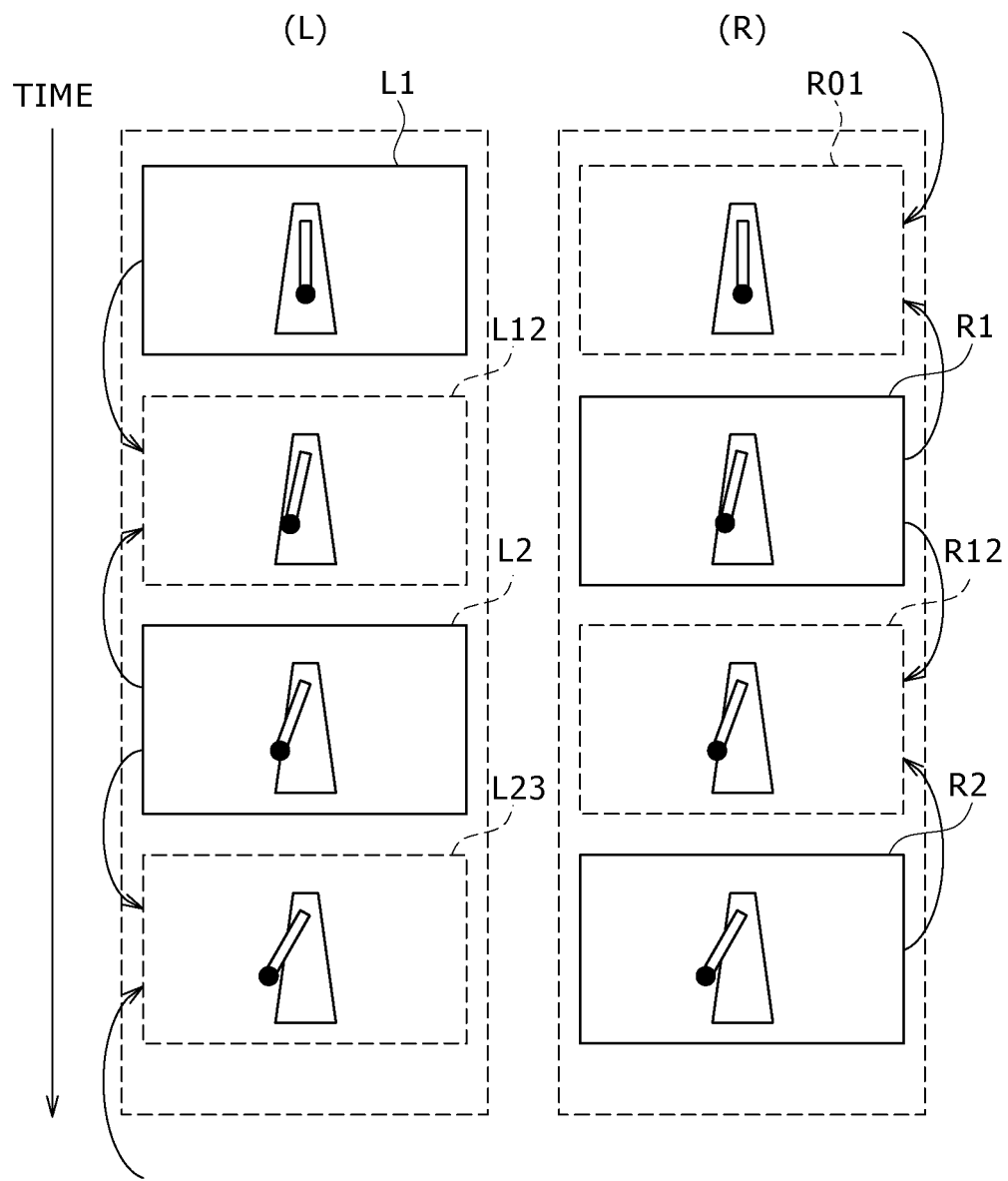
FIG. 25 is a schematic diagram showing Example 2 of image processing (image interpolation processing).

FIG. 24 is a schematic diagram showing an example in which the left-hand side images (L: L1, L2, ... ) and the right-hand side viewpoint images (R: R1, R2, ... ) are arranged along the time axis. Because with the image pickup apparatus 1, the left-hand side images (L) and the right-hand side viewpoint images (R) are alternately acquired in the time division manner, actually, the images of the left-hand side images (L), and the images of the right-hand side viewpoint images (R) are not mutually captured at the same time. For this reason, for example, when the moving subject is photographed, there is no program as long as the left-hand side viewpoint images and the right-hand side viewpoint images are alternately output from side to side in order by using the frame sequential type display device. However, when the left-hand side viewpoint images and the right-hand side viewpoint images are output simultaneously, the unnatural stereoscopic effect is provided. This results from that a change in the subject image due to the parallax, and a change in the subject image due to the motion are clearly separated between the left-hand side viewpoint images and the right-hand side viewpoint images.

In order to cope with this situation, image interpolation processing for generating the images (interpolated images) between each adjacent two images is executed in accordance with the information on temporally previous or next one or more images in each of the pixel column of the left-hand side viewpoint images, and the pixel column of the right-hand side viewpoint images. Specifically, an interpolated image L12 is generated between the image L1 and the image L2 in accordance with the information on the image L1 and the image L2. Likewise, an interpolated image L23, and interpolated images R01, R12 are respectively generated in accordance with the information on the temporally previously or next images. This image interpolation processing may also be executed before the image is recorded, thereby recording data on the interpolated image together with data on the captured image. In addition, the data on only the captured image may be recorded, and the interpolated image may be generated in a phase of display. As a result, it is possible to separate the change in the subject image due to the parallax, and the change in the subject image due to the motion from each other, and thus a feeling of strangeness is prevented from being brought even when the right-hand side viewpoint images and the left-hand side viewpoint images are simultaneously displayed.

The embodiments and Changes thereof have been described by exemplifying the case where the liquid crystal shutter is used as the shutter 11, and the region of the shutter is divided into the right-hand and left-hand side two regions in order to switch the optical path. However, the region of the shutter may be divided into three or more regions, and thus three or more multiple viewpoint images may be acquired.

It should be understood that various changes and modifications to the presently preferred example embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An image capturing apparatus comprising:
   an image sensor configured to operate in a line-sequential manner; and
   a shutter device operatively coupled to the image sensor, the shutter device including regions configured to switch between substantially open states and substantially closed states such that after a first exposure for a first frame is finished, a second exposure for a second frame is started, wherein the shutter device includes a liquid crystal shutter which includes the regions; and wherein:
   (a) a first response from a first open state to a first closed state is delayed for a first amount of time; and (b) a second response from the first closed state to the first open state is delayed for a second amount of time, the second amount of time being greater than the first amount of time.

2. The image capturing apparatus of claim 1, wherein the image sensor is the only image sensor included in the image capturing apparatus.

3. The image capturing apparatus of claim 1, wherein the shutter device is the only shutter device included in the image capturing apparatus.

4. The image capturing apparatus of claim 1, wherein the image sensor is configured to output a received light signal based on a light transmitted through the shutter device.

5. The image capturing apparatus of claim 1, wherein the regions include:
   (a) a first region configured to switch between a first substantially open state and a first substantially closed state; and
   (b) a second region configured to switch between a second substantially open state and a second substantially closed state.

6. The image capturing apparatus of claim 5, wherein, when the second exposure is started:
   (a) the first region switches from the first substantially open state to the first substantially closed state; and
   (b) the second region switches from the second substantially closed state to the second substantially open state.

7. The image capturing apparatus of claim 1, wherein the image sensor shutter includes a global reset function wherein accumulated electric charges are reset at a predetermined time.

8. The image capturing apparatus of claim 1, wherein the regions are configured to start switching from the substantially closed states to the substantially open states before an occurrence of a frame start time corresponding to a start of the first exposure.

9. The image capturing apparatus of claim 1, wherein the regions are configured to switch from the substantially open states to the substantially closed states before an occurrence of a frame start time corresponding to a start of the second exposure.

10. The image capturing apparatus of claim 1, wherein a first start of the first exposure begins after a second start of the first frame.

11. The image capturing apparatus of claim 1, which includes a controller storing drive sequences for the shutter device, the controller being configured to perform switching for the drive sequences based on response characteristics of the shutter device.

12. The image capturing apparatus of claim 1, wherein the regions are configured to switch between the substantially open states and substantially closed states based on a material of the shutter device.

13. The image capturing apparatus of claim 1, which includes a controller configured to:
    (a) acquire a first image based on the first exposure;
    (b) acquire a second image based on the second exposure;
    (c) acquire a third image based on a third exposure; and
    (d) using the first, second and third images, reduce an influence of jerkiness by performing motion blurring processing.

14. The image capturing apparatus of claim 1, which includes a controller configured to:
    (a) acquire a first image based on the first exposure;
    (b) acquire a second image based on the second exposure;
    (c) acquire a third image based on a third exposure;
    (d) acquire a fourth image based on a fourth exposure;
    (e) generate a first interpolated image between the acquired first image and the acquired third image; and
    (f) generate a second interpolated image between the acquired second image and the acquired fourth image.

15. The image capturing apparatus of claim 1, wherein the regions are configured to switch between completely open states and completely closed states such that after a first exposure for a first frame is finished, a second exposure for a second frame is started.

16. The image capturing apparatus of claim 1, which includes a first lens and a second lens, wherein the shutter device is disposed between the first lens and the second lens.

17. The image capturing apparatus of claim 1, wherein the image sensor includes a complementary metal oxide semiconductor sensor.

18. An image capturing apparatus comprising:
    an image sensor configured to operate in a line-sequential manner; and
    a shutter device operatively coupled to the image sensor, the shutter device including regions configured to switch between substantially open states and substantially closed states such that after a first exposure for a first frame is finished, a second exposure for a second frame is started, wherein the shutter device includes a liquid crystal shutter which includes the regions, and wherein: (a) a first response from a first open state to a first closed state is delayed for a first amount of time; and (b) a second response from the first closed state to the first open state is delayed for a second amount of time, the second amount of time being less than the first amount of time.

19. The image capturing apparatus of claim 18, wherein the regions include:
    (a) a first region configured to switch between a first substantially open state and a first substantially closed state; and
    (b) a second region configured to switch between a second substantially open state and a second substantially closed state.

20. The image capturing apparatus of claim 19, wherein, when the second exposure is started:
    (a) the first region switches from the first substantially open state to the first substantially closed state; and
    (b) the second region switches from the second substantially closed state to the second substantially open state.

* * * * *